(12) United States Patent
Mann et al.

(10) Patent No.: US 11,715,495 B2
(45) Date of Patent: Aug. 1, 2023

(54) MODIFICATION OF OBJECTS IN FILM

(71) Applicant: Flawless Holdings Limited, London (GB)

(72) Inventors: Scott Mann, London (GB); Pablo Garrido, London (GB); Hyeongwoo Kim, London (GB); Sean Danischevsky, London (GB); Robert Hall, London (GB); Gary Myles Scullion, London (GB)

(73) Assignee: Flawless Holdings Limited, London (GB)

( * ) Notice: Subject to any disclaimer, the term of this patent is extended or adjusted under 35 U.S.C. 154(b) by 0 days.

(21) Appl. No.: 17/561,356

(22) Filed: Dec. 23, 2021

(65) Prior Publication Data

US 2022/0383906 A1   Dec. 1, 2022

Related U.S. Application Data

(60) Provisional application No. 63/203,354, filed on Jul. 19, 2021, provisional application No. 63/193,553, filed on May 26, 2021.

(51) Int. Cl.
*G11B 27/036* (2006.01)
*G06T 3/00* (2006.01)

(52) U.S. Cl.
CPC .......... *G11B 27/036* (2013.01); *G06T 3/0093* (2013.01)

(58) Field of Classification Search
CPC .............................. G11B 27/036; G06T 3/0093
See application file for complete search history.

(56) References Cited

U.S. PATENT DOCUMENTS

| | | | |
|---|---|---|---|
| 6,366,885 B1 * | 4/2002 | Basu | G11B 27/10 704/E21.02 |
| 11,398,255 B1 | 7/2022 | Mann et al. | |
| 2003/0198402 A1 | 10/2003 | Zhang et al. | |
| 2010/0183192 A1 * | 7/2010 | Fritsch | G06T 7/254 701/469 |
| 2012/0154684 A1 | 6/2012 | Luo et al. | |

(Continued)

FOREIGN PATENT DOCUMENTS

| | | | |
|---|---|---|---|
| CN | 113269872 A | 6/2021 | |
| CN | 113111861 A | 7/2021 | |

(Continued)

OTHER PUBLICATIONS

Garrido et al: "Reconstruction of Personalized 3D Face Rigs from Monocular Video" ACM Transactions on Graphics, Sep. 2015.

(Continued)

*Primary Examiner* — Mishawn N. Hunter
(74) *Attorney, Agent, or Firm* — EIP US LLP

(57) ABSTRACT

A computer-implemented method of processing video data comprising a sequence of image frames. The method includes isolating an instance of an object within the sequence of image frames, generating a modified instance of the object using a machine learning model, and modifying the video data to smoothly transition between at least part of the isolated instance of the object and a corresponding at least part of the modified instance of the object over a subsequence of the sequence of image frames.

19 Claims, 13 Drawing Sheets

(56) References Cited

U.S. PATENT DOCUMENTS

| | | | |
|---|---|---|---|
| 2014/0321702 A1* | 10/2014 | Schmalstieg | G06T 19/006 382/103 |
| 2017/0061966 A1* | 3/2017 | Marcheret | G10L 15/16 |
| 2018/0240221 A1* | 8/2018 | Rijnders | G06T 5/10 |
| 2018/0374499 A1 | 12/2018 | Zadgaonkar et al. | |
| 2020/0084427 A1* | 3/2020 | Sun | H04N 13/106 |
| 2020/0250836 A1* | 8/2020 | Li | G06T 7/155 |
| 2021/0150793 A1 | 5/2021 | Stratton et al. | |
| 2021/0248801 A1 | 8/2021 | Li et al. | |
| 2021/0272599 A1 | 9/2021 | Patterson et al. | |
| 2021/0365707 A1 | 11/2021 | Mao et al. | |
| 2022/0035961 A1 | 2/2022 | Ziabari et al. | |
| 2022/0067967 A1 | 3/2022 | Luo et al. | |
| 2022/0067982 A1 | 3/2022 | Pardeshi et al. | |

FOREIGN PATENT DOCUMENTS

| | | |
|---|---|---|
| CN | 113256821 A | 8/2021 |
| CN | 113628326 A | 11/2021 |
| GB | 2601162 A | 5/2022 |
| WO | 2021155140 A1 | 8/2021 |

OTHER PUBLICATIONS

Tewari et al: "High-Fidelity Monocular Face Reconstruction based on an Unsupervised Model-based Face Autoencoder" IEEE Transactions on Pattern Analysis and Machine Intelligence, 2018.

Kim et al: "Neural Style-Preserving Visual Dubbing" Cornell University, Sep. 5, 2019.

Kim et al: "Deep Video Portraits" Cornell University, May 29, 2018.

Lu et al: "Deep Regression Tracking with Shrinkage Loss" ECCV 2018 paper.

Prajwal et al: "Towards Automatic Face-to-Face Translation" Cornell University, Mar. 1, 2020 https://arxiv.org/abs/2003.00418.

"Create Crazy Morphing Animations" Animating with AI, Mar. 8, 2020 https://www.youtube.com/watch?v=67w5CTkxXdA.

Combined Search and Examination Report dated Aug. 3, 2022 for GB Application No. GB2201238.9.

Combined Search and Examination Report dated Aug. 2, 2022 for GB Application No. GB2201237.1.

Rozantsev, "On rendering synthetic images for training an object detector", 2015.

Fried et al.: "Text-based editing of talking-head videa" ACM Transactions On Graphics, vol. 38, No. 4, Jul. 12, 2019, pp. 1-14, XP058452128.

Chuang et al.: "Performance Driven Facial Animation using Blendshape Interpolation" Technical report CS-TR-2002-02, Jan. 1, 2002, pp. 1-8, XP055973917.

Ezzat at al: "MikeTalk: a talking facial display based on morphing visemes" Computer Animation 98. Proceedings Philadelphia, Jun. 8, 1998, pp. 96-102, XP010285088.

Anonymous: "Michael Jackson—Black or White (1991)—Computer Animation history-CGI!" Dec. 10, 2020, pp. 1-11, XP055971741.

Xin et al.: "Photorealistic Audio-driven Video Portraits" IEEE Transactions on Visualization and Computer Graphics, vol. 26, No. 12, Sep. 17, 2020, pp. 3457-3466, XP011819361.

Garrido et al.: "Vdub: Modifying Face Video of Actors for Plausible Visual Alignment to a Dubbed Audio Track", Computer Graphics Forum: Journal of the European Association for Computer Graphics, vol. 34, No. 2, May 1, 2015, pp. 1-12, XP055827600.

International Search Report and Written Opinion dated Oct. 24, 2022 for PCT Application No. PCT/GB2022/051337.

International Search Report and Written Opinion dated Nov. 4, 2022 for PCT Application No. PCT/GB2022/051338.

* cited by examiner

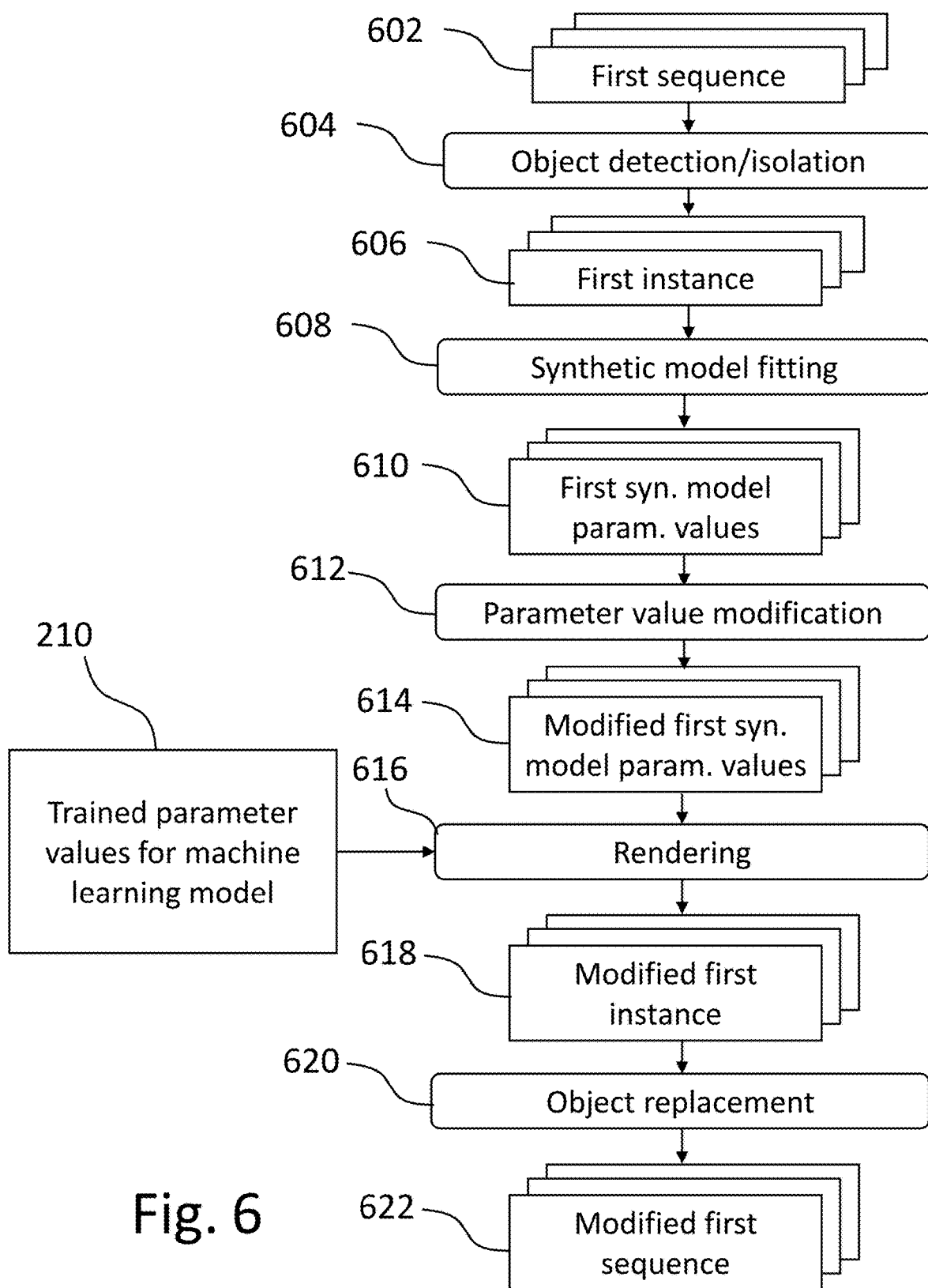

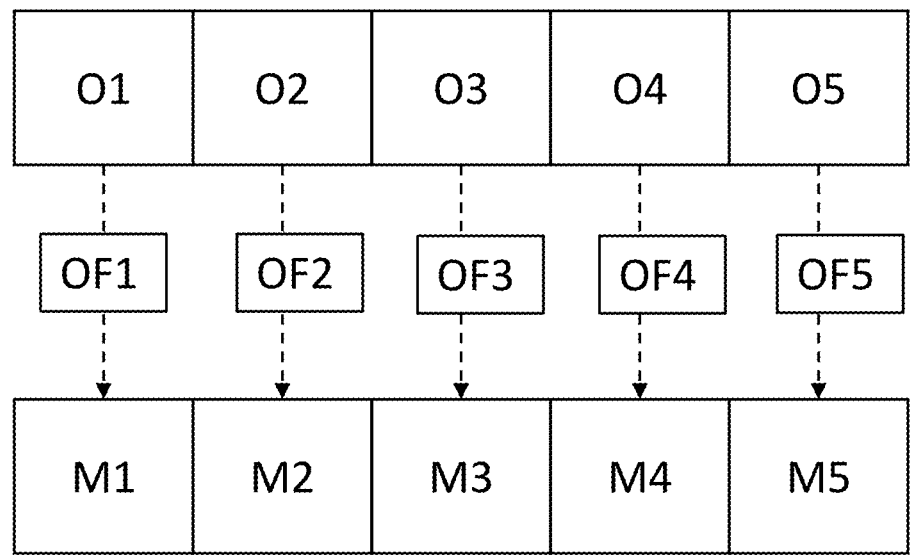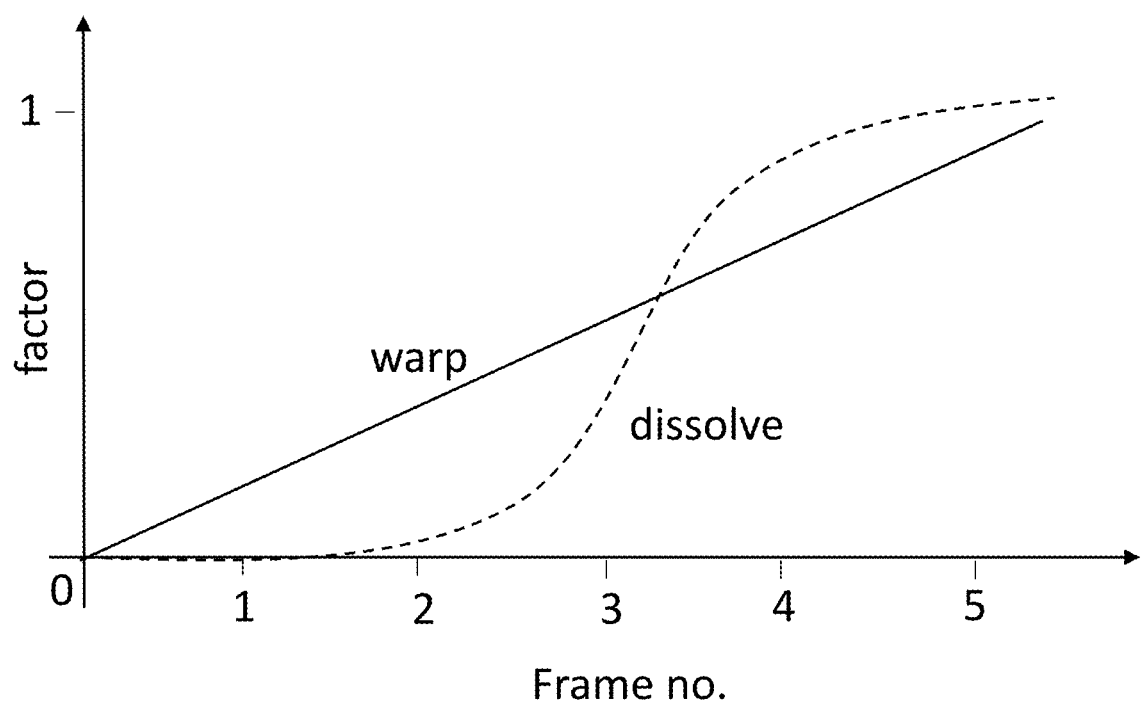
Fig. 11

MODIFICATION OF OBJECTS IN FILM

CROSS-REFERENCE TO RELATED APPLICATIONS

This application claims the benefit of U.S. Provisional Application No. 63/193,553, filed May 26, 2021 and U.S. Provisional Application No. 63/203,354, filed Jul. 19, 2021.

BACKGROUND OF THE INVENTION

Field of the Invention

The present invention relates to modifying objects or portions of objects within a film. The invention has particular, but not exclusive, relevance to visual dubbing of foreign language feature films.

Description of the Related Technology

The production of live action feature films (filmmaking) is a time-consuming and expensive process, and typically requires the involvement of a large number of skilled professionals performing a large number of interdependent tasks subject to strict constraints on time and resources. A typical filmmaking process involves a production phase spread over multiple shoots, in which raw video footage is captured (along with audio) for multiple takes of each scene of the film, typically by multiple cameras and potentially in various video formats. A post-production phase then takes place, including an offline edit in which the raw footage is copied and compressed before selected portions are assembled by an editor and/or director to generate an offline edit. Sections of the raw video footage corresponding to the offline edit are then obtained, and visual effects (VFX) are applied where necessary whilst the audio is mixed, edited, and rerecorded if necessary. The resulting footage and audio is then subject to a finishing stage in which additional processes, such as color grading, may be applied before the master copy of the film is delivered.

The high cost and interdependence of tasks involved in the filmmaking process, along with the typical time constraints and variability of factors such as weather and availability of actors, mean that it is rarely feasible to reshoot scenes of a film. The film must therefore be constructed from the footage generated during the initial production phase, with VFX applied where appropriate. The production phase typically generates hundreds of hours of high-resolution raw video footage, only a small fraction of which is ultimately used in the film. The raw footage may not capture the desired combination of actor performance(s) and conditions such as weather, backdrop, lighting etc., the latter of which can be modified only to a limited extent during the VFX and finishing stages.

When the filmmaking process is complete, the master copy of the film is delivered for screening in cinemas, on streaming services, on television, and so on. For some films, foreign language versions may be produced in parallel with the original film, for delivery at the same time as the original film. Foreign language versions of a film typically use text subtitles or audio dubbing to reproduce dialogue in a desired language. In either of these cases, it is generally accepted that the foreign language version of the film loses much of the nuance and quality of the original film.

SUMMARY

According to a first aspect, there is provided a computer-implemented method of processing video data comprising a plurality of sequences of image frames. The method includes identifying respective instances of an object within at least some of the sequences of image frames. For at least some of the identified instances of the object, the method include isolating said instance of the object within image frames containing said instance of the object, and determining associated parameter values for a synthetic model of the object using the isolated instance of the object. The method includes training, using the isolated instance of the object and the associated parameter values for the synthetic model of the object, a machine learning model to reconstruct the isolated instance of the object based at least in part on the associated parameter values for the synthetic model of the object. The method further includes obtaining a first sequence of image frames containing a first instance of the object, isolating said first instance of the object within the first sequence of image frames, determining first parameter values for the synthetic model of the object using the isolated first instance of the object, modifying the first parameter values, rendering a modified first instance of the object using the trained machine learning model and the modified first parameter values for the synthetic model of the object, and replacing at least part of the first instance of the object within the first sequence of image frames with a corresponding at least part of the modified first instance of the object.

By training a machine learning model to reconstruct instances of an object isolated from within the video data, the present methodology enables photorealistic "deep editing" of video data which goes beyond the capabilities of conventional VFX. The plurality of sequences of image frames may for example correspond to footage of various takes of a scene within a feature film, providing a rich source of training data for the machine learning model under relatively consistent lighting/ambient conditions. The first sequence of image frames may or may not be one of the plurality of sequences of image frames. The methodology is well suited for integration into a filmmaking pipeline, where the training of the machine learning model can take place in parallel with the offline editing process, potentially using the same video data as the offline editing process.

The object may be a face of a specific human, in which case the method may be used for applications such as visual dubbing for a foreign language version of a film, or performance transposition where a performance of an actor from a particular take of a particular scene is transposed into a different take of the same scene, a different scene, or even a different film. The at least part of the object may be a part of the human face including the mouth but excluding the eyes. The inventors have found that by replacing only this region of the face, minimum impact on the actor's performance can be achieved whilst still providing realistic visual dubbing or performance transposition.

Modifying the first parameter values may include determining target parameter values for the synthetic model of the object, and progressively interpolating between the first parameter values and the target parameter values over a subsequence of the first sequence of image frames. The interpolation may include linear interpolation and/or non-linear interpolation. In this way, the original first instance may be made to progressively transition to the modified first instance in a smooth and seamless fashion. Furthermore, the deviation of the modified first instance from the original first instance can be ramped up and down to provide enable continuous deep editing of the object instance. For example, where the purpose of modifying the first instance is to match an audio track, the deviation may be maximized when a discrepancy between the original first instance and the audio track would be most noticeable. The perceived impact on the original video may thereby be minimized whilst achieving the desired result.

In an example in which the first parameter values are progressively interpolated as described above, the computer-implemented method may further include detecting an event in the sequence of image frames and/or in an audio track associated with the first sequence of image frames, determining one or more image frames of the first sequence of image frames at which the detected event takes place, and determining the subsequence of the first sequence of image frames in dependence on the determined one or more image frames at which the detected event takes place. For example, the subsequence of the first sequence of image frames may be determined such that the subsequence ends before the event takes place. The first instance of the object may therefore undergo maximum modification at the time of the event. In the context of visual dubbing, the event may for example be an event where a plosive consonant or a bilabial nasal consonant is uttered either in the primary language or the secondary language, as this is when the visual discrepancy between the primary language and secondary language may be most noticeable.

The machine learning model may include a deep neural network configured to process one or more input images to generate an output image. For said at least some of the identified instances of the object, isolating the instance of the object may include generating a registered portion of each said image frame containing the instance of the object, and training the machine learning model may include: rendering, for each said image frame containing the instance of the object, a synthetic image of part of the instance of the object using the synthetic model and the associated parameter values for the synthetic model; overlaying, for each said image frame containing the instance of the object, the synthetic image of said part of the instance of the object on the registered portion of each said image frame containing the instance of the object, to generate a respective composite image; and adversarially training the deep neural network to process the generated composite images to reconstruct at least one frame of the isolated instance of the object. By providing the composite image as an input to the deep neural network, the network may learn how to take account of lighting, color, and other characteristics derivable from regions outside the at least part of the object instance to be modified, whilst also learning to perform realistic inpainting for seamless integration of the modified part of the object instance into the original image frames. In other examples, a synthetic image of the entire instance of the object may be provided as an input to the deep neural network, in addition to or as an alternative to the composite image.

The deep neural network may be configured to process an attention mask alongside each of the one or more input images to generate the output image. For said at least some of the identified instances of the object, training the machine learning model may include generating, for each said image frame containing said instance of the object, a respective attention mask highlighting one or more features of said instance of the object, and training the deep neural network to process the respective attention masks alongside the generated composite images to reconstruct the at least one frame of the isolated instance of the object. By providing the attention mask as an independent input to the deep neural network, the network may learn to focus attention on particular regions of the composite image as guided by the attention mask. The attention mask may include one or more layers highlighting different features of the object. The respective attention mask may for example include a segmentation mask separating the instance of the object from a background region, and/or masks indicating other features such as facial features in the case that the object is a face. The attention masks may be generated from the synthetic model of the object, along with the synthetic images. The adversarial training of the deep neural network may further use an adversarial loss restricted to an object region defined by the attention mask, concentrating the efforts of the deep neural network to faithfully reconstruct the object region.

The adversarial training of the deep neural network may use an adversarial loss and one or more further loss functions, for example a perceptual loss function or a photometric loss function indicating photometric differences between the at least one frame of the isolated instance of the object and the reconstructed at least one frame of the isolated instance of the object. The further loss function(s) may be restricted to the object region defined by the respective attention mask. Using a photometric loss and/or a perceptual loss in combination with an adversarial loss teaches the network to generate a photorealistic reconstruction of the original instance of the object. The photometric loss may be an L2 loss modified to reduce a contribution of small photometric differences, which the inventors have found to reduce artefacts in the renderings generated by the deep neural network.

The deep neural network may be configured to process a projected ST map alongside each of the one or more input images to generate the output image. For said at least some of the identified instances of the object, training the machine learning model may include: generating a respective projected ST map for each said image frame containing said instance of the object, the respective projected ST map having pixel values corresponding to texture coordinates on the synthetic model of the object; and training the deep neural network to process the respective projected ST maps alongside the generated composite images to reconstruct the at least one frame of the isolated instance of the object. The projected ST map provides an input which the deep neural network can use to relate surface regions of the object to positions in the composite image, enhancing the ability of the deep neural network to accurately reconstruct instances of the object.

The deep neural network may be configured to process a projected noise map alongside each of the one or more input images to generate the output image. For said at least some of the identified instances of the object, training the machine learning model may include: generating a respective projected noise map for each said image frame containing said instance of the object, the respective projected noise map having pixel values corresponding to values of a noise texture applied to the synthetic model of the object; and training the deep neural network to process the respective projected noise maps alongside the generated composite images to reconstruct the at least one frame of the isolated instance of the object. The projected noise map provides an additional input using which the deep learning model can learn to construct spatially-dependent textures within its rendering output.

The computer-implemented method may include, for said at least some of the identified instances of the object, color normalizing the isolated instance of the object, and the training of the machine learning model may use the color normalized isolated instance of the object. Color normalizing the isolated instance simulates similar lighting conditions throughout the training data, simplifying the task of the machine learning model.

In examples, identifying respective instances of the object may include discarding image frames in which an instance of the object is rotated with respect to an axis coplanar with the image frame by an angle outside a predetermined range. In some cases, it may be difficult to train the machine learning model to reconstruct instances of an object at all possible. In order to with this issue, the method may treat views of an object from different perspectives as entirely different objects, and train separate models for these accordingly.

Replacing the at least part of the first instance of the object may include: determining optical flow data estimating, for a subset of the first sequence of image frames falling within a temporal window, a warping relating the first instance of the object to the modified first instance of the object; incrementally, over the subset of the first sequence of image frames, applying the estimated warping to the first instance of the object to determine an incrementally warped first instance of the object; incrementally, over the subset of the first sequence of image frames, applying an inverse of the estimated warping to the modified first instance of the object to determine an incrementally warped modified first instance of the object; and incrementally, over the subset of the first sequence of image frames, dissolving the incrementally warped first instance of the object into the incrementally warped modified first instance of the object. Incrementally warping and dissolving the images enables seamless incorporation of the modified first instance into the first sequence of image frames in situations where a step change would otherwise be visible.

The incrementally dissolving may take place at a dissolving rate, and the incrementally applying the estimated warping and the inverse of the estimated warping may takes place at a warping rate. A ratio of the dissolving rate to the warping rate may increase to a maximum value then decrease within the subsequence of the sequence of image frames. In this way, the incrementally dissolving may for example be concentrated within a central set of image frames of the subset. The inventors have found that concentrating the dissolving in this way can achieve a more seamless transition between the first instance of the object and the modified first instance of the object, which maintains image sharpness during the warping.

Replacing the at least part of the first instance of the object may include: determining optical flow data indicating an estimated warping relating the first instance of the object to the modified first instance of the object; applying the estimated warping to the first instance of the object to determine a warped first instance of the object; blurring the warped first instance of the object; blurring the modified first instance of the object; adjusting colors of the modified first instance of the object based on a pixelwise ratio of the blurred warped first instance of the object and the blurred modified first instance of the object, to generate a color graded modified first instance of the object; and replacing the at least part of the first instance of the object with a corresponding at least part of the color graded modified first instance of the object. The pixelwise ratio of the blurred warped first instance and the blurred modified first instance represents a color grading map for matching the color of the modified first instance to the original first instance of the object, enabling short-scale local variations in lighting and color to be reproduced on the modified first instance of the object. The blurring of the warped instance of the object and the blurring of the modified instance of the object may be performed using a blurring filter with a characteristic length scale of between 3 and 20 pixels.

The associated parameter values for the synthetic model for said at least some of the identified instances of the object may include: base parameter values encoding a base geometry of the object; and deformation parameter values encoding, for each said image frame containing the instance of the object, a deformation of the base geometry of the object. The first parameter values for the synthetic model may then include first deformation parameter values encoding a respective deformation of the base geometry of the object for each image frame of the first sequence of image frames. Modifying the first parameter values may include modifying the first deformation parameter values. For some use cases, the desired modification of an object is a deformation of a non-rigid object, in which case only the deformation parameter values may need to be modified.

Modifying the first deformation parameter values may include: obtaining a second sequence of image frames containing an instance of a second object (where the second object may be the same object as the first object or may be a different object to the first object); isolating the instance of the second object within the second sequence of image frames to generate second isolated instance data; determining, using the second isolated instance data, second parameter values for the synthetic model, the second parameter values comprising second deformation parameter values encoding a deformation of a base geometry of the second object for each image frame of said second sequence of image frames; and updating the first deformation parameter values using the second deformation parameter values. In this way, the second sequence of image frames is used as driving data for modifying the first deformation parameter values. In the case of visual dubbing, the second object will typically correspond to a face of a dubbing actor. In the case of performance transposition, the second object will typically correspond to the face of the original actor.

The first sequence of image frames may be at a higher resolution than the plurality of sequence of image frames. In this case, rendering the modified first instance of the object may include rendering an intermediate first instance at a resolution consistent with the plurality of image frames, and applying a super-resolution neural network to the intermediate first instance to render the modified first instance. This enables the machine learning model to be trained using lower resolution image data, significantly reducing the computational demands of the training, whilst still enabling high resolution renders to be produced, suitable for incorporation into high resolution video data.

According to a second aspect, there is provided a computer-implemented method of processing video data comprising a plurality of sequences of image frames. the method includes identifying respective instances of an object within at least some of the sequences of image frames. For at least some of the identified instances of the object, the method include isolating said instance of the object within image frames containing said instance of the object, and determining associated parameter values for a synthetic model of the object using the isolated instance of the object. The method includes training, using the isolated instance of the object and the associated parameter values for the synthetic model of the object, a machine learning model to reconstruct the isolated instance of the object based at least in part on the associated parameter values for the synthetic model of the object.

According to a third aspect, there is provided a computer-implemented method of processing video data comprising a first sequences of image frames containing a first instance of an object. The method includes isolating said first instance of the object within the first sequence of image frames, determining first parameter values for the synthetic model of the object using the isolated first instance of the object, modifying the first parameter values, rendering a modified first instance of the object using a trained machine learning model and the modified first parameter values, and replacing at least part of the first instance of the object within the first sequence of image frames with a corresponding at least part of the modified first instance of the object.

According to a fourth aspect, there is provided a computer-implemented method of processing video data comprising a sequence of image frames. The method includes isolating an instance of an object within the sequence of image frames, generating a modified instance of the object using a machine learning model, and modifying the video data to progressively transition between at least part of the isolated instance of the object and a corresponding at least part of the modified instance of the object over a subsequence of the sequence of image frames.

The subsequence of the sequence of image frames may be a first subsequence of the sequence of image frames, and said modifying of the video data may be to progressively transition from the at least part of the isolated instance of the object to the corresponding at least part of the modified instance of the object. The method may further include further modifying the video data to progressively transition from the at least part of the modified instance of the object back to the corresponding at least part of the isolated instance of the object, over a second subsequence of the sequence of image frames. In this way, the method may smoothly or incrementally transition from the isolated instance of the object to the modified instance of the object, and back again, for example in dependence on certain events within the video data and/or associated audio data.

According to a fifth aspect, there is provided a non-transient storage medium storing video data. The video data includes a first sequence of image frames comprising a photographic representation of an object, a second sequence of image frames in which at least part of the photographic representation of the object is replaced by a corresponding at least part of a synthetic representation of the object, and a third sequence of image frames between the first sequence of image frames and the second sequence of image frames. In the third sequence of image frames, the at least part of the photographic representation of the object is modified to progressively transition between the at least part of the photographic representation of the object at the end of the first sequence of image frames and the corresponding at least part of the synthetic representation of the object at the start of the second sequence of image frames.

The modifying of the at least part of the photographic representation of the object may include simultaneously warping and dissolving the at least part of the photographic representation of the object into the at least part of the synthetic representation of the object. The warping may take place incrementally at a warping rate, and the dissolving may take place incrementally at a dissolving rate, wherein a ratio of the dissolving rate to the warping rate may increase to a maximum value then decrease within the third sequence of image frames. The dissolving may thereby be concentrated within a central set of image frames of the subsequence, can achieve a seamless transition between the photographic representation of the object and the synthetic representation of the object, whilst maintaining image sharpness during the warping.

The synthetic representation of the object may be a first synthetic representation of the object, and the modification of the at least part of the photographic representation of the object may include a progressive interpolation between a second synthetic representation of the object and the first synthetic representation of the object, wherein the second synthetic representation of the object geometrically corresponds to the photographic representation of the object. The photographic representation of the object may thus be replaced by a geometrically corresponding synthetic representation before the synthetic representation is modified or deformed. The synthetic representation may be deformed or modified in a way that would not be feasible for the photographic representation. By spatially or geometrically aligning the photographic representation and the synthetic representation, the effect of modifying the photographic representation can be achieved.

According to a sixth aspect, there is provided a data processing system comprising means for carrying out any of the methods described above. The data processing system may include one or more processors and memory, wherein the memory stores machine readable instructions which, when executed by the one or more processors, cause the one or more processors to perform any of the methods described above.

According to a seventh aspect, there is provided a computer program product (for example, a computer program stored on a non-transient storage medium) comprising instructions which, when the program is executed by a computer, cause the computer to carry out any of the methods described above.

According to an eighth aspect, there is provided an audiovisual product produced using any of the methods described above.

Further features and advantages of the invention will become apparent from the following description of preferred embodiments of the invention, given by way of example only, which is made with reference to the accompanying drawings.

BRIEF DESCRIPTION OF THE DRAWINGS

FIG. 6 shows schematically a method of modifying an instance of an object within a sequence of image frames.

FIG. 11 illustrates an example of processing video data in accordance with the method of FIG. 10.

DETAILED DESCRIPTION OF CERTAIN INVENTIVE EMBODIMENTS

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Embodiments of the present disclosure relate to modifying objects in film. In the present disclosure, film may refer to any form of digital video data or audiovisual product. In particular, embodiments described herein address challenges related to modifying objects in feature films in a manner which is seamless both in terms of the quality of output and also in terms of the integration of the associated processes into a filmmaking workflow. The technology disclosed herein provides methods relevant to tasks such as visual dubbing of foreign language films, performance transposition between film scenes, and modification of background objects within a film.

Figure 1:
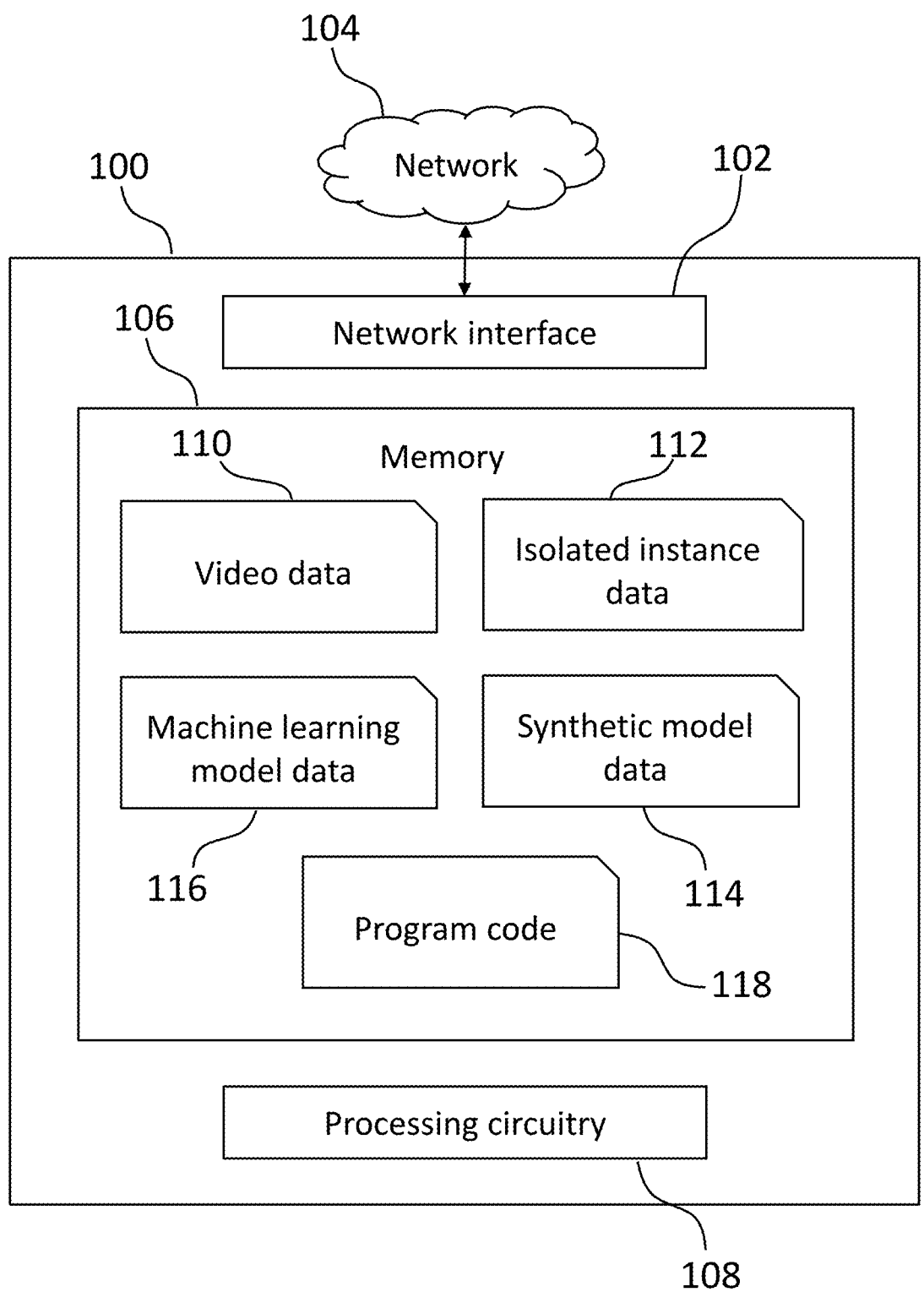
FIG. 1 shows schematically a data processing system arranged in accordance with examples.

FIG. 1 schematically shows a data processing system 100 in accordance with examples. The data processing system 100 includes a network interface 102 for communicating with remote devices over a network 104. The data processing system 100 may be a single device such as a server computer or may include multiple devices, for example multiple server computers connected via a network. The data processing system 100 includes memory 106, which in the present disclosure refers both to non-volatile storage and to volatile and non-volatile working memory. The memory 106 is communicatively coupled to processing circuitry 108, which may include any number of processing units such as a central processing unit (CPU), a graphics processing unit (GPU), a neural processing unit (NPU) or neural network accelerator (NNA), one or more application specific integrated circuits (ASICs), a digital signal processor (DSP), and so on.

The memory 106 is arranged to store various types of data for implementing the methods described hereinafter. In particular, the memory 106 may store video data 110 comprising sequences of image frames, where a sequence of image frames may correspond to raw and/or processed video footage captured by one or more cameras. The video data 110 may for example include picture rushes captured during a production of a film, and/or may include compressed or otherwise processed footage. The video data 110 may also include modified video footage, resulting from the application of methods described herein.

The memory 106 may further store isolated instance data 112 indicative of isolated instances of one or more objects appearing within the video data 110. In the present disclosure, an instance of an object broadly refers to an uninterrupted appearance of the object within a sequence of image frames. For example, in a given scene of a film, an object may appear within a first sequence of image frames, then be occluded or move outside the field of view camera for a second sequence of image frames, then reappear later in a third sequence of image frames, in which case two instances of the object would be recorded. The isolated instance data 112 may include sequences of image frames extracted from the video data 110, and/or may include metadata such as timestamps indicating in which portion of the video data 110 a given instances appears, along with a position, scale, and/or orientation of the object at each video frame in which the instance appears. The isolated instance data 112 may further include a registered portion of each image frame in which the instance appears, for example a bounding box which may be resized, rotated and/or stabilized as will be described in more detail hereinafter.

The memory 106 may further store synthetic model data 114 encoding synthetic models of one or more objects appearing in the video data 110. A synthetic model of an object may approximate geometrical features of the object as well as colors, textures, and other visual features of the object. A synthetic model may be a three-dimensional model enabling a two-dimensional synthetic image to be rendered corresponding to a view of the synthetic model from a given camera position and orientation. A synthetic model may have adjustable parameters for controlling aspects of the model. For example, a synthetic model may correspond to a particular class or type of object, and may have adjustable parameters which have different values corresponding to different objects within the class, and/or for different instances of a given object within the class. For example, a synthetic model for the class of "human faces" may be capable of representing a range of human faces, and also a range of orientations, facial expressions, and so on, by specifying values for the adjustable parameters of the synthetic model. Alternatively, a synthetic model may correspond to a specific object. For example, a synthetic model may be a deformable model of a non-rigid object, such that different deformations may correspond to different values for the adjustable parameters of the synthetic model.

The memory 106 may further store machine learning model data 116 corresponding to a machine learning model. A machine learning model is a class of algorithm which generates output data based at least in part on parameter values which are learned from data, as opposed to being manually programmed by a human. Of particular relevance to the present disclosure are deep learning models, in which machine learning is used to learn parameter values of one or more deep neural networks, as will be described in more detail hereinafter. The data processing system 100 may use machine learning models for, among other tasks, rendering photorealistic instances of an object for incorporation into a video, based at least in part on parameter values for a synthetic model of the object. The machine learning data 116 may include parameter values learned in dependence on the video data 110 and other data, as will be described in more detail hereinafter.

The memory 106 may further store program code 118 comprising routines for implementing the computer-implemented methods described herein. The routines may enable completely automated implementations of the methods described herein, and/or may enable user input to control various aspects of the processing. The program code 118 may for example define a software tool to enable users to perform deep editing of objects in video data.

Figure 2:
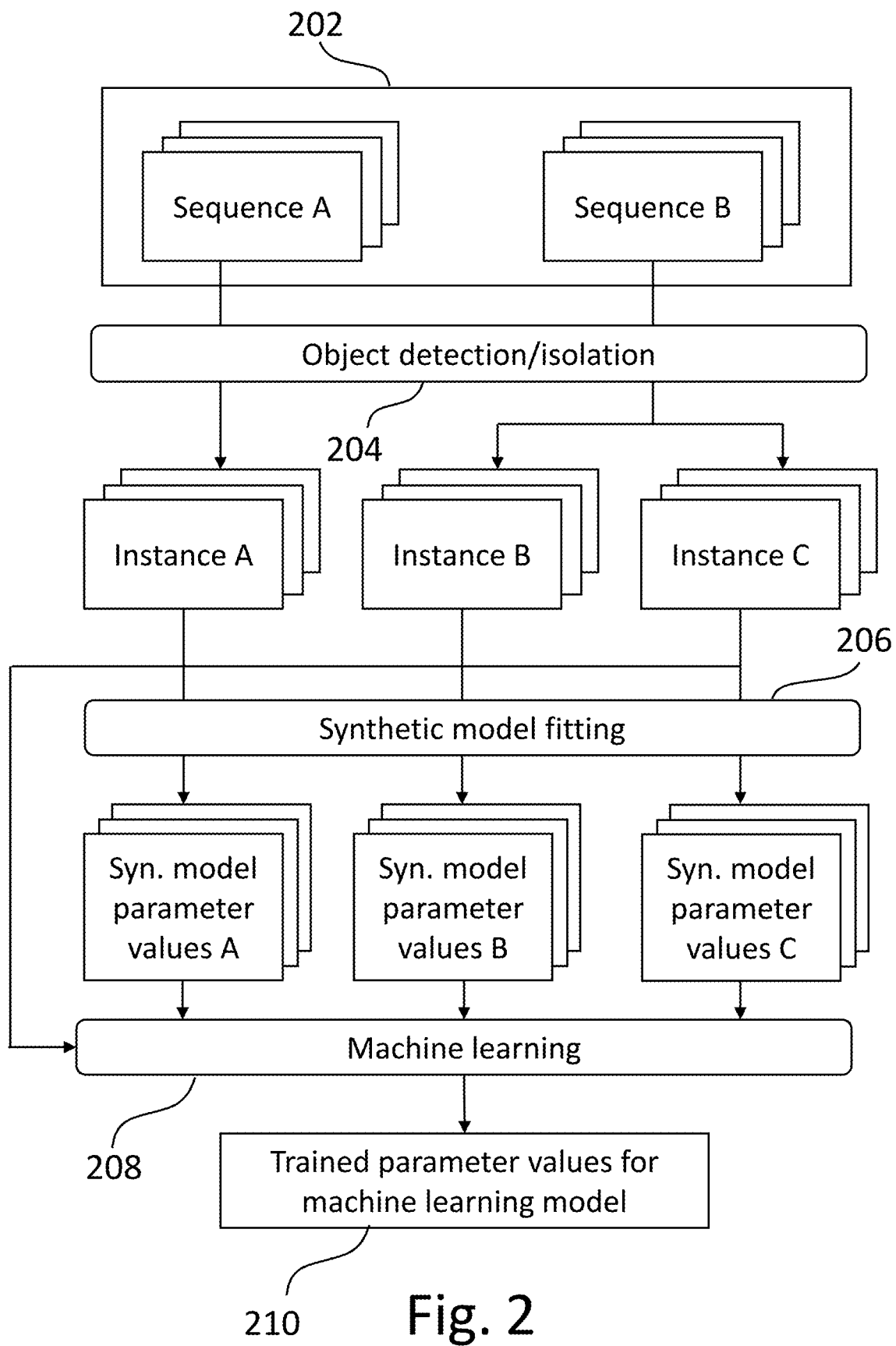
FIG. 2 shows schematically a method of training a machine learning model in accordance with examples.

FIG. 2 shows a method of processing video data 202 to train a machine learning model, in accordance with examples. The method may be performed by any suitable data processing system, for example the data processing system 100 of FIG. 1. When trained, the machine learning model may be used to generate photorealistic instances of an object for incorporation into a video. The video data 202 includes multiple sequences of image frames, of which sequence A of image frames and sequence B of image frames are shown. Each sequence of image frames may correspond to footage of a respective take of a scene, or part of a scene, of a feature film. The video data 210 may include all takes of all scenes of the film (i.e. all picture rushes), or a subset thereof. Prior to the method of FIG. 2 taking place, the footage may be downsized or compressed and/or converted to a common format. For example, the footage may be converted to a 2K format (i.e. a format in which the horizontal dimension is approximately 2000 pixels). In this way, the format of the video data 210 (including e.g. the resolution, pixel depth, color format) may be made consistent for the processing described hereafter. Furthermore, downsizing the footage may significantly reduce the computational cost of training the machine learning model. During the conventional filmmaking process, this process is typically performed in order to generate lower volumes of data for handling during the offline editing process. The video data 202 may be the same data used for offline editing.

The method of FIG. 2 proceeds with performing object detection and isolation 204 on each sequence of image frames. In this context, object detection may identify image frames containing instances of objects of a predetermined class, and generate metadata indicating a location of each such object in each image frame. The metadata may include for example a location and dimensions of a bounding box for the object in each image frame containing the object. Depending on the object detection algorithm, the bounding boxes may have predetermined dimensions (for example, squares, or rectangles of fixed aspect ratio, of one or more fixed sizes) or may have variable dimensions. It is common for the apparent size of an object to change between instances and/or between image frames, and therefore the object detection algorithm is preferably capable of detecting objects at multiple scales. The object detection algorithm may be a machine learning algorithm, such as a deep learning algorithm. Examples of suitable object detection algorithms include Region-Based Convolutional Neural Network (R-CNN), Fast R-CNN, Faster R-CNN, Region-based Fully Convolutional Network (R-FCN), Single Shot Detector (SSD), and You Only Look Once (YOLO—multiple versions available, up to v5 at the time of writing). Various techniques may be used during training of these algorithms to achieve desired performance level for a given task, including data selection, data augmentation, and bootstrapping.

The object detection and isolation 204 may result in multiple instances of a given object being detected and isolated. In the present example, instance A is detected in sequence A of image frames, and instances B and C are detected in sequence B of image frames (indicating that the object disappeared and reappeared from view within sequence B of image frames).

In addition to detection instances of objects of a given class, object detection and isolation 204 may include recognizing distinct object of the same class. In an example where the objects are human faces, each time an instance of a face is detected, the method may perform facial recognition to determine whether the face is a new face or a face which has been detected before. In this way, instances of a first object may be distinguished from instances of a second object, and so on. The metadata stored with a detected instance of an object may accordingly include an identifier for the object.

In addition to detecting instances of an object, object detection and isolation 204 may include determining locations of a sparse set of two-dimensional landmarks on the isolated instances of the object. Two-dimensional landmarks are two-dimensional feature points coarsely representing an object. These landmarks may be used to assist with synthetic model fitting as described hereinafter. In the case where the object is a human face, the landmarks may for example include points surrounding the eyes and mouth and following the ridge of the nose. Two-dimensional landmarks may be detected on a per-frame basis using sparse keypoint detection methods. Optical flow may additionally be used over a sequence of image frames, to determine temporally-consistent trajectories for the detected landmarks, improving the accuracy with which the positions of the landmarks are estimated.

Object detection and isolation 204 may further include stabilizing and/or registering the isolated instances of the object. The stabilizing and/or registering may be performed for example to ensure that for each frame of a given isolated instance, the object appears at a relatively consistent rotational angle with respect to an axis normal to the plane of the image frames. For a detected instance of an object, the object detection and isolation 204 may therefore include determining a stabilization point on each said image frame containing the instance of the object, where the stabilization point may for example be determined in dependence on the locations of one or more two-dimensional landmarks. The method may then include stabilizing the instance of the object about the determined stabilization point, such that the stabilization point remains at a fixed location and the object does not appreciably rotate about this point. This stabilization may be performed using any suitable image registration technique, and may make use of two-dimensional landmarks, if these have been determined. In some cases, registration may be performed without needing to define a stabilization point. The inventors have found it beneficial to stabilize the object instance in order to reduce the difficulty of downstream tasks including synthetic model fitting and/or machine learning. It has been found to be particularly beneficial to determine a stabilization point that lies within, or close to, the part of the object instance to be replaced. In the case of visual dubbing or performance transposition of a human face, the stabilization point may be at the center of the mouth.

Each isolated instance may be stored as a video clip along with metadata including, for example, data indicating which image frames contain the instance, along with the location, size, and orientation of the instance within each image frame containing the instance. The location, size, and orientation may for example be stored as coordinates of the top left and bottom right corners of the bounding box within the image frame. Other metadata includes information identifying the object, a resolution of the image frames, and a frame rate. The isolated instance may optionally be stored with associated guide audio.

Figure 3:
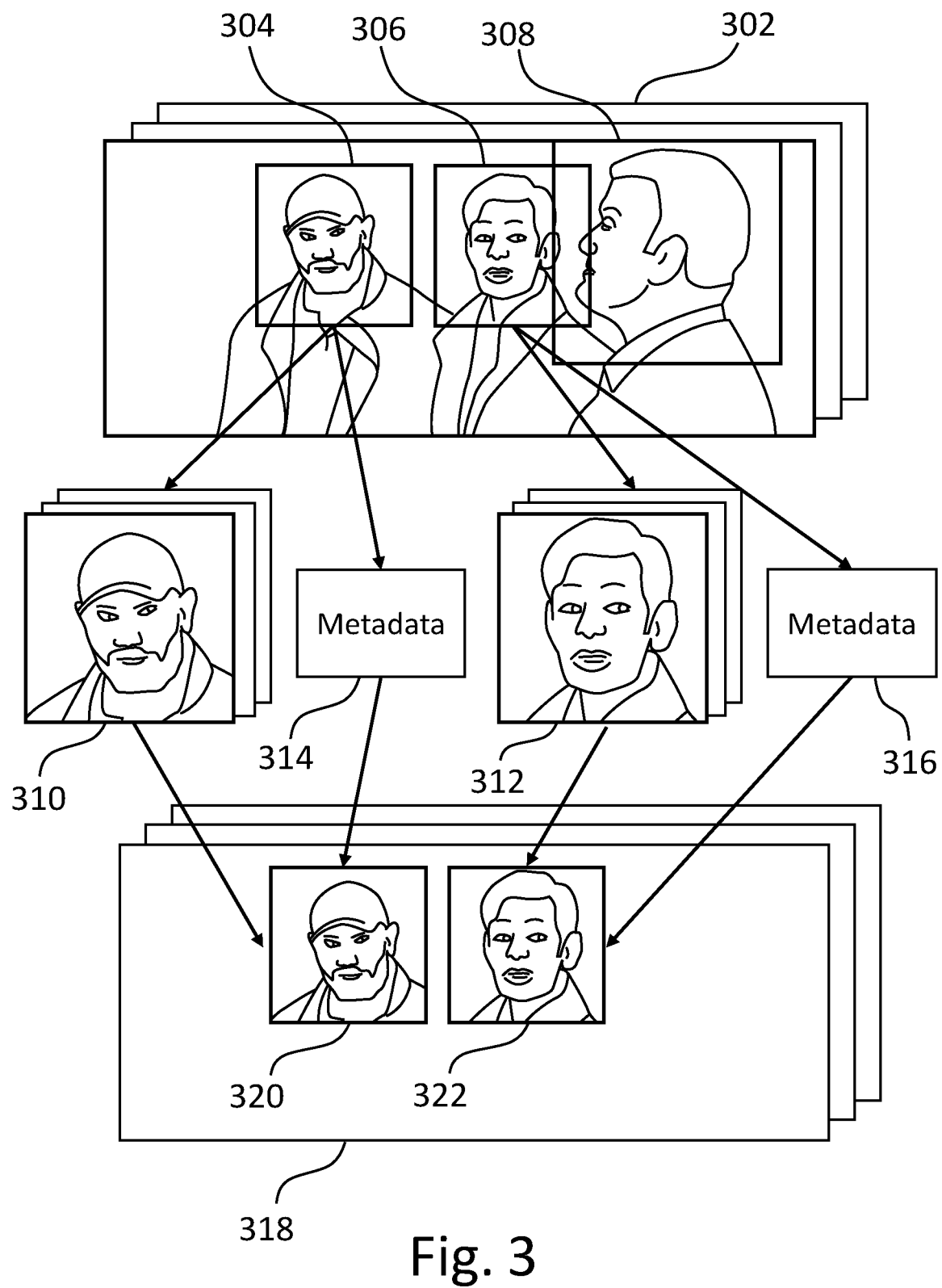
FIG. 3 shows an example of instances of objects being isolated from a sequence of image frames.

The metadata comprises information required for a portion of the sequence of image frames to be reconstructed from the isolated instance. FIG. 3 shows an example of a sequence of image frames 302 corresponding to footage of a particular take of a scene from a film, for which a foreign language version is to be generated using methods described herein. In this example, an instance 304 of a first actor, an instance 306 of a second actor, and an instance 308 of a third actor, are detected and recognized, where the different actors are treated as different "objects" within the meaning of the present disclosure. In this example, the instance 308 of the third actor appears in profile whereas the instances 304, 306 of the first and second actors appear approximately front-on. In some examples, profile views of a specific actor (or more generally, views in which an Euler angle with respect to an axis coplanar with the image frame lies outside a predetermined range) may be treated as a different object to front-on views of the same actor. The instances 304, 306 are isolated to generate isolated instances 310, 312, along with respective metadata 314, 316. In this example, it is determined that the third actor does not speak in the scene, and therefore the instance 308 of the third actor is not isolated. The metadata 314, 316 enables a sequence of image frames 308 to be generated from the isolated instances 310, 312 which includes a sequence of overlay frames 318 to be generated containing reconstructions 320, 322 of the instances 304, 306 at the original positions in the sequence of image frames 302.

The method of FIG. 2 continues with synthetic model fitting 206, in which the isolated instances of the object are used to determine parameter values for a synthetic model of the object. The synthetic model may be a synthetic dense three-dimensional model such a three-dimensional morphable model (3DMM) of the object, and may consist of a mesh model formed of polygons such as triangles and/or quadrilaterals each having respective edges and vertices. The synthetic model may be parameterized by a set of fixed parameters and a set of variable parameters. The fixed parameters encode characteristics of the object which are not expected to change (or which can reasonably be modelled as not changing) between image frames, whereas the variable parameters encode characteristics which may change between image frames. The fixed parameters may include base parameter values for encoding a base geometry of the object treated a starting point to which deformations are applied (for example, a geometry of a face with a neural expression). The base geometry may include, for example, positions of a set of vertices for a mesh model. The variable parameters may include deformation parameters for encoding changes to the base geometry of the object. These deformation parameters may for example control deformations of respective vertices of a mesh. Alternatively, the deformation parameters may control weightings for a linear combination of a predetermined set of blendshapes, where each blendshape corresponds to a specific global deformation of the base geometry. Alternatively, the deformation parameters may control weightings for a linear combination of a predetermined set of delta blendshapes, where each delta blendshape corresponds to a deformation over a specific subset of vertices. By specifying particular weightings, the linear combination of blendshapes or delta blendshapes may be capable of expressing a wide range of deformations to the base geometry.

In addition to the base parameters, the fixed parameters of the synthetic model may include parameters encoding a reflectance model for the surface of the object (and/or other surface characteristics of the object), along with intrinsic camera parameter values for projecting the synthetic model to an image plane (though in some cases the intrinsic camera parameter values may be known and not necessary to determine). The reflectance model may treat the surface of the object as a perfect diffuse surface that scatters incident illumination equally in all directions. Such a model may be referred to as a Lambertian reflectance model. This model has been found to achieve a reasonable trade-off between complexity and realistic results.

The variable parameters may additionally include parameters encoding a position and/or orientation of the object with respect to a camera as viewed within the isolated instance of the object, along with a lighting model characterizing the irradiance of the object at a given point. The lighting model may model the illumination at a given point on the surface of the object using a predetermined number of spherical harmonic basis functions (for example, the first three bands L0, L1, L2 of spherical harmonic basis functions). The combination of the reflectance model and the lighting model enable the irradiance at a given point on the surface of the object to be modelled in dependence on a set of parameter values to be determined during model fitting.

As explained above, parameter values for the synthetic model of an object are determined for each instance of an object, with at least some of the parameter values being determined on a frame-by-frame basis. In the example of FIG. 2, a respective set of parameter values is determined for each of the instances A, B and C of the object detected at 204. The parameter values for the synthetic model may be determined independently for each instance of the object. Alternatively, some of the fixed parameter values (such as those encoding the base geometry and reflectance model) may be fitted across multiple instances of the object, which may result in improved accuracy particularly for instances of the object which include relatively few image frames and/or for which the object is not clearly visible.

The synthetic model of the object, along with parameter values determined for a particular isolated instance of the object, may be used to generate synthetic images corresponding to projections of the object onto an image plane. By comparing these synthetic images with corresponding frames of the isolated instance, parameter values may be determined which minimize a metric difference or loss function characterizing a deviation between the synthetic images and the corresponding frames of the isolated instance. In this way, parameter values may be determined which fit the synthetic model to the isolated instance of the object. Additional techniques may be used to enhance the accuracy of the model fitting, for example including a loss term comparing positions of two-dimensional landmarks detected on the isolated instances of the object with corresponding feature vertices of the synthetic model, or a loss term comparing specific contours on the isolated instances of the object with corresponding contours of the synthetic model.

The method of FIG. 2 continues with machine learning 208, in which the isolated instances of the object, and the associated parameter values for the synthetic model, are used to train a machine learning model to reconstruct the isolated instances of the object. By performing this training for multiple instances of the object (for example, instances from multiple takes of a scene from a film), the machine learning model may learn to generate photorealistic instances of the object based on a set of parameter values for the synthetic model. The machine learning 208 process generates trained parameter values 210 for the machine learning model.

The machine learning model may include one or more neural networks. For example, the machine learning model may include a conditional generative adversarial network (GAN) comprising a generator network configured to generate images in dependence on the parameter values of the synthetic model, and a discriminator network configured to predict whether a given image is a genuine instance of the object or was generated by the generator network. The generator network and the discriminator network may be trained alongside each other using an adversarial loss function which rewards the discriminator network for making correct predictions and rewards the generator network for causing the discriminator to make incorrect predictions. This type of training may be referred to as adversarial training. The adversarial loss function may be supplemented with one or more further loss functions, such as a photometric loss function which penalizes differences between pixel values of the isolated instance of the object and pixel values of the image output by the generator network, and/or a perceptual loss function which compares the image output by the generator network with the isolated instance in a feature space of an image encoder (such as a VGG net trained on ImageNet). By combining an adversarial loss function with a photometric and/or perceptual loss function, the generator network may learn to generate sequence of images which are both photometrically alike to the isolated instances of the object and stylistically indistinguishable from the isolated instances of the object. In this way, the generator network may learn to generate photorealistic reconstructions of isolated instances of the object.

In one example, the machine learning model may include a generator network which takes as input a set of parameter values derived from a sequence of one or more frames of an isolated instance of an object and generates an output image. During training, the output image may be compared with a predetermined frame of the sequence (for example, the middle frame or the last frame), in which case the generative network may learn to reconstruct that frame. By using parameter values from multiple frames, the generative network may take into account information from before and/or after the frame to be reconstructed, which may enable the generator network to take into account dynamic characteristics of the object.

Figure 4:
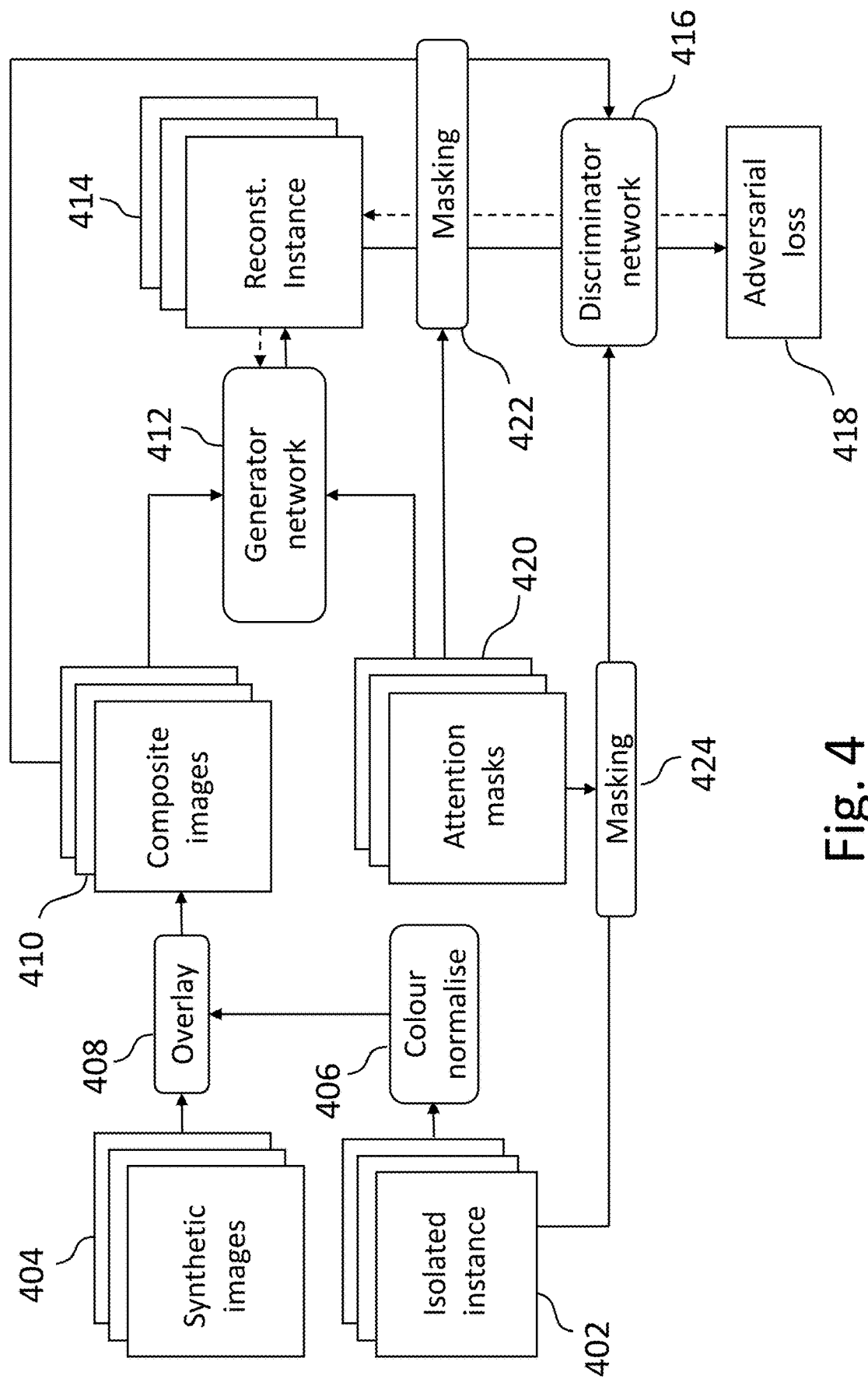
FIG. 4 shows schematically a method of training a deep neural network model in accordance with examples.

As an alternative to processing parameter values of the synthetic model directly, the machine learning model be arranged to take inputs derived from the synthetic model itself. For example, the machine learning model may be arranged to process input data based at least in part on synthetic images rendered from the synthetic model. FIG. 4 shows an example of a method in which a sequence of synthetic images 402 rendered from a synthetic model of an object, and corresponding to an isolated instance 404 of the object, is used to generate input data for a neural network. Each of the synthetic images 402 may include the entire object or part of the object, for example part of the object which is to be replaced or modified. The synthetic image may include an alpha channel encoding an alpha matte or binary mask which designates a background region surrounding the object, or part of the object, as transparent. The isolated instance 404 optionally undergoes color normalization 406, where the color normalization may be performed on a per frame basis, or with respect to all frames of the isolated instance 404. Performing color normalization simulates similar coarse lighting conditions across all isolated instances of the object, which may assist the learning process described hereafter by reducing the extent of the space of images which the machine learning model must learn to generate.

For each frame containing the isolated instance 404 of the object, part of a corresponding synthetic image 402 may be overlaid 408 onto the (possibly color-normalized) frame of the isolated instance 404, resulting in a composite image 408. As explained above, each frame of the isolated instance 404 may be a registered portion of an image frame containing the instance of the object. The part of the synthetic image 402 to be overlaid may be defined using a segmentation mask, which may be generated using the synthetic model of the object. In order to generate the mask, an ST map may be obtained having linearly increasing values of U and V encoded in red and green channels respectively. The ST map may then be mapped to the synthetic model using UV mapping. A suitable region for the mask may be defined on the ST map, either manually or automatically, for example by reference to predetermined feature vertices on the synthetic model (as described above). A projection of the mapped region may then be rendered for each synthetic image 402, and the rendered projection may then be used to define the geometry of the mask for the overlaying process. This approach results in a mask which adheres to the geometry of the synthetic model, and only needs to be defined once for a given object or for a given instance of an object. The mask used for the overlaying may be a conventional binary segmentation mask or may be a soft mask, where the latter results in a gradual blend between the isolated instance 404 and the overlaid part of the synthetic images 402.

Figure 5A:
FIGS. 5A-5C show examples of inputs to a deep neural network.

FIG. 5A shows an example of a composite image as described above, in which a part 502 of a synthetic image of a face rendered from a synthetic model of the face is overlaid onto a frame 504 containing an isolated instance of the face. The part 502 in this example include the mouth but excludes the eyes, and is defined using a binary mask generated using an ST map as described above.

Returning to FIG. 4, the composite images 410 are provided as inputs to a generator network 412. The generator network 412 is configured to process the composite images 410 to generate a candidate reconstruction 414 of the instance of the object. By processing the composite images 410, as opposed to the full synthetic images 402 generated by the synthetic model, more information is available to the generator network 412 regarding the lighting and color characteristics of the instance to be reconstructed, in particular in the region surrounding the part to be replaced. This has been found to enhance the ability of the generator network 412 to reconstruct instances of the object as the generator network 412 learns how to perform inpainting such that the reconstructed part of the object seamlessly blends into surrounding regions of the object. It is noted that whilst in the present example a composite image is provided as an input to the generator network 412, in other examples a full render of the synthetic model may alternatively, or additionally, be provided as an input.

In a single forward pass, the generator network 412 may be configured to process a space-time volume comprising predetermined number of composite images 410 (for example, 1, 2, 5, 10 or any other suitable number of composite images 410), to generate one or more frames of the candidate reconstruction 414, corresponding to a predetermined one or more of the composite images 410. A space-time volume in this context refers to a collection of images consecutively appearing within a temporal window. The generator network 412 may for example output a candidate reconstruction of a single frame corresponding to the last composite image 410 of the space-time volume. By simultaneously processing multiple composite images 410, the generator network 412 may learn to use information on how the object moves over time in order to achieve a more realistic output. By performing this processing in a temporally sliding window fashion, the generator network 412 may generate a candidate reconstruction of the object for each frame containing the isolated instance of the object For the first or last few frames, the space-time volume may not be defined and such frames may be discarded for the purpose of training the generator network 412. Alternatively, the space-time volume may be extended by replicating the first and/or last frame X times, where X is the size of the temporal window, effectively imposing a Dirichlet boundary condition. In this way, the space-time volume remains defined, but is biased at the first and last few image frames. Other boundary conditions may be alternatively be used to extend the space-time volume.

The generator network may have an encoder-decoder architecture comprising an encoder portion configured to map a space-time volume to a latent variable in a low-dimensional latent space, and a decoder portion configured to map the latent variable to one or more frames containing a candidate reconstruction of the object. The encoder portion may consist of several downsampling components which may each reduce the resolution of their input. A given downsampling component may include a convolutional filter and a nonlinear activation function (such as the rectified linear unit, ReLU, activation function). The decoder portion may consist of several upsampling components which may each increase the resolution of their input. A given upsampling component may include a deconvolutional filter and a nonlinear activation function, along with optionally other layers or filters. At least some components of the encoder and/or decoder portions may utilize batch normalization and/or dropout during training. In a specific example, the generator network 412 includes 8 downsampling components to reduce the resolution from 256×256 to 32×32, and 8 upsampling components to return the resolution to 256× 256. Each downsampling component employs a 4×4 convolutional layer at stride 2 followed by batch normalization, dropout, and a leaky ReLU activation function. Each upsampling component utilizes a cascaded refinement strategy and employs a 4×4 deconvolutional filter at stride 2, followed by batch normalization, dropout and a ReLU activation function, followed by two 3×3 convolutional filters at stride 1 each followed by a further ReLU activation function. The output of the final upsampling component is passed through a TanH activation function to generate a single frame of the candidate reconstructed instance of the object. Batch normalization may be omitted from the first downsampling component and the last upsampling component, and as a refinement the architecture may employ skip connections from the input layer to one or more of the decoder components to enable the network to transfer fine-scale structure. It will be appreciated that other architectures are possible for the generator network 142, and the present architecture is provided by means of example only.

The generator network 412 is adversarially trained to reconstruct the isolated instance 404 of the object. In this example, a discriminator network 416 is employed which takes as input the same space-time volume of composite images 410 used by the generator network 412 to generate one or more frames of the reconstructed instance 414, along with either the one or more frames of the reconstructed instance 414 generated by the generator network 412 or a corresponding one or more frames of the isolated instance 402 (which may be considered "ground truth" in this context). The discriminator network attempts to predict whether it has received the reconstructed instance 414 or the ground truth isolated instance 412. An adversarial loss 418 is determined which rewards the discriminator network 416 for making correct predictions and rewards the generator network 412 for causing the discriminator network 416 to make incorrect predictions. Backpropagation (represented in FIG. 4 by dashed arrows) is then used to determine a gradient of the adversarial loss 418 with respect to parameters of the generator network 412 and the discriminator network 416, and the parameter values of the generator network 412 and the discriminator network 416 are updated in dependence on the determined gradient of the adversarial loss, for example using stochastic gradient descent or a variant thereof. The adversarial loss 418 may be supplemented with one or more further losses (not shown), such as a photometric loss which penalizes differences between pixel values of the isolated instance 402 and pixel values of the reconstructed instance 414 output by the generator network 412, or a perceptual loss which penalizes differences between image features of the isolated instance 402 and image features of the reconstructed instance 414 output by the generator network 412. The photometric loss may for example be an L1 loss, an L2 loss, or any other suitable loss based on a comparison between pixel values of the isolated instance 402 and pixel values of the reconstructed instance 414. In a particular example, the photometric loss may be a modified L2 loss which is modified to reduce a contribution of small photometric differences. In this way, the contribution from training samples on which the generator network 412 performs well (i.e. easy samples) is reduced compared with the contribution from training samples on which the generator network 412 struggles (i.e. difficult samples). For example, the photometric loss may be a modified L2 loss in which the squared photometric difference is multiplied by a sigmoid or soft step function which reduces the contribution of photometric differences of less than a predetermined value. The inventors have found that using this type of loss function during training results in the generator network 412 generating highly accurate renderings with fewer artefacts than certain other loss functions.

By combining an adversarial loss function with a photometric loss function, the generator network 412 can learn to generate reconstructed instances of the object which are both photometrically alike to the ground truth instances of the object and stylistically indistinguishable from the ground truth instances of the object, meaning that the reconstructed instances preserve idiosyncrasies of the isolated instance.

Figure 5B:
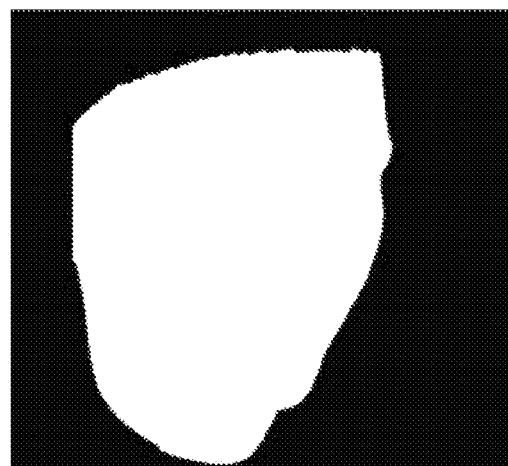

The generator network 412 may further be configured to process an attention mask 420 alongside each composite image 410, and the attention mask 420 may further be applied to the inputs of the discriminator network 416 during masking operations 422, 424, prior to being input to the discriminator network 416. This has the effect of restricting the loss function to the region defined by the attention mask 420. The photometric loss (if present) may similarly be restricted to the region defined by the attention mask 420. The attention mask 420 may be a conventional binary mask or a soft mask, and may delimit a region containing the entirety of the object or part of the object. The attention mask 420 may be output from the synthetic model of the object, or may be generated from the isolated instance of the object, for example using semantic segmentation. By providing the attention mask 420 as an additional input to the generator network 412 and restricting the loss function to the region defined by the attention mask 420, the generator network 412 can learn to focus attention on the object as opposed to the background. This may be of particular importance in the case of a dynamic background as would be expected in a motion picture. The attention mask 420 may define a larger region than the part of the object to be modified and replaced, such that the generator network 412 focuses attention on regions surrounding the part to be modified, thereby learning to integrate the part to be replaced with the surrounding region of the object. Alternatively, or additionally, to providing the attention mask 420 as an input to the generator network 412, the attention mask 420 may be applied to the composite image before the composite image is input to the generator network 412. In any of these cases, the generator network 412 may produce a "hallucinated" output for regions outside the attention mask 420, due to there being no training signal relating to these regions of the output. FIG. 5B shows an example of an attention mask corresponding to the composite image of 5A. In this case, it is observed that the attention mask defines an area of the face greater than the part 502 of the face to be replaced.

Figure 5C:
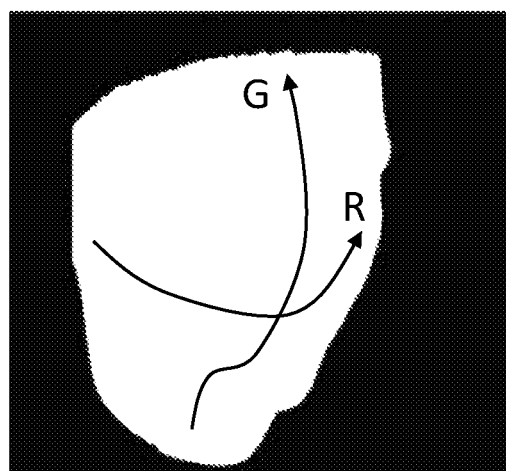

The generator network 412 may further be configured to process a projected ST map (not shown in FIG. 4) alongside each composite image frame 410. As explained above, the projected ST map may be generated using the synthetic model from which the synthetic images 404 are generated. In particular, a generic ST map may be obtained having linearly increasing values of U and V encoded in red and green channels respectively. The ST map may be applied to the synthetic model using UV mapping, and a projection of the ST map rendered for each synthetic image 404. FIG. 5C shows an example of a projected ST map corresponding to the composite image of 5A and the attention mask of FIG. 5B. It is observed that the color of the projected ST map varies across the surface of the face, with red (R) increasing from the left side of the face to the right side of the face (as viewed), and green (G) increasing from the lower part of the face to the upper part of the face. Since the ST map adheres to the surface of the synthetic model, pixels corresponding to the same position on the face in two different synthetic images will have a common pixel value (color). The projected ST map may enable the generator network 412 to relate surface regions of the synthetic model to positions in the composite image, assisting the generator network 412 to generate surface details at consistent positions on the object. In other examples, a projected normal coordinate code (PNCC) image may be used instead of an ST map as a spatially-dependent input to the generator network 412. However, the projected ST map may be preferable as the projected ST map more directly maps surface regions of the object to positions in the composite image, and uses only two channels compared with the three channels of a PNCC image. In further examples, other types of projected map may be input to the generator network 412, in addition or as an alternative to the projected ST map or a PNCC image, which may further improve the quality of the output of the generator network 412. For example, one or more projected maps may be generated from the synthetic model to accentuate particular features or aspects of the object. For example, a projected topology map may be generated indicating a topology of the object surface. This may help the generator network 412 to generate details which are consistent with the topology of the object surface. In an example where the object is a human face, a topology map may indicate a topology of facial features such as the nose and mouth.

The generator network 412 may further be configured to process a projected noise map (not shown) alongside each composite image frame 410 (and optionally one or more other maps). Similarly to the projected ST map, the projected noise map may be generated using the synthetic model from which the synthetic images 404 are generated. In particular, a noise map may be obtained in which pixel values independent identically distributed random variables (such as Gaussian variables), or alternatively in which the noise pixel values are dependent. In a particular example, the noise map may be a Perlin noise map. The noise map may be applied to the synthetic model using UV mapping, and a projection of the noise map rendered for each synthetic image 404. The noise map provides an additional resource which the generator network 412 can use to generate rich textures which adhere to the surface of the object. Perlin noise is particularly well suited to representing complex natural textures. The noise map may for example be stored in the blue channel of the ST map (since the ST map by default only uses the red and green channels), in which case the UV mapping only needs to be performed once. Additional maps may further be provided as inputs to the generator (for example as additional channels of the ST and/or noise map) to enhance the quality of the output rendered by the generator network 412. For example, the generator network 412 may be provided with a generic map emulating grain details, or one or more maps derived from the synthetic model of the object, such as normal and/or displacement maps.

The machine learning model trained using the methods above may subsequently be used to generate photorealistic modified instances of an object, as described hereafter. FIG. 6 shows a method in which machine learning model of FIG. 2, along with the trained parameter values 210, are used to modify an instance of an object in a first sequence 602 of image frames. The first sequence 602 may correspond to one of the sequences of image frames used to train the machine learning model, though in some examples the first sequence 602 may not have undergone the downsizing or compression described in relation to the training process, because the aim of this stage is to generate the highest quality, most photorealistic rendered instance of an object, and the computational cost is less of an issue than during training. In the context of a filmmaking pipeline, the first sequence 602 of image frames may be at the highest resolution at which the film is required to be delivered. The first sequence 602 may be determined manually (for example, a user may decide that an instance of an object in this sequence needs to be replaced), or may be determined automatically for example where a speaking character is detected in the context of visual dubbing.

The method of FIG. 6 proceeds with object detection and isolation 604, which in this example results in an isolated first instance of the object, along with metadata for replacing the first instance of the object, as described above. Synthetic model fitting 608 is then performed to generate first parameter values 610 for the synthetic model of the object. The increased resolution of the first instance 606 compared with those used for training may result in more accurate synthetic model fitting 608.

The first parameter values 610 for the synthetic model are modified at 612, resulting in modified first parameter values 614. The modification 612 of the first parameter values 610 results in the appearance of the synthetic model being modified, and ultimately enables the rendering of modified instances of the object. The modification of the first parameter values may be performed manually, for example by receiving user input via a user interface from which the modified first parameter values can be derived, enabling deep editing of the object instance beyond that which would be achievable using conventional VFX techniques. Alternatively, the modification 612 of the first parameter values 610 may be performed at least partially automatically, for example in dependence on driving data such as video driving data and/or audio driving data.

Figure 7:
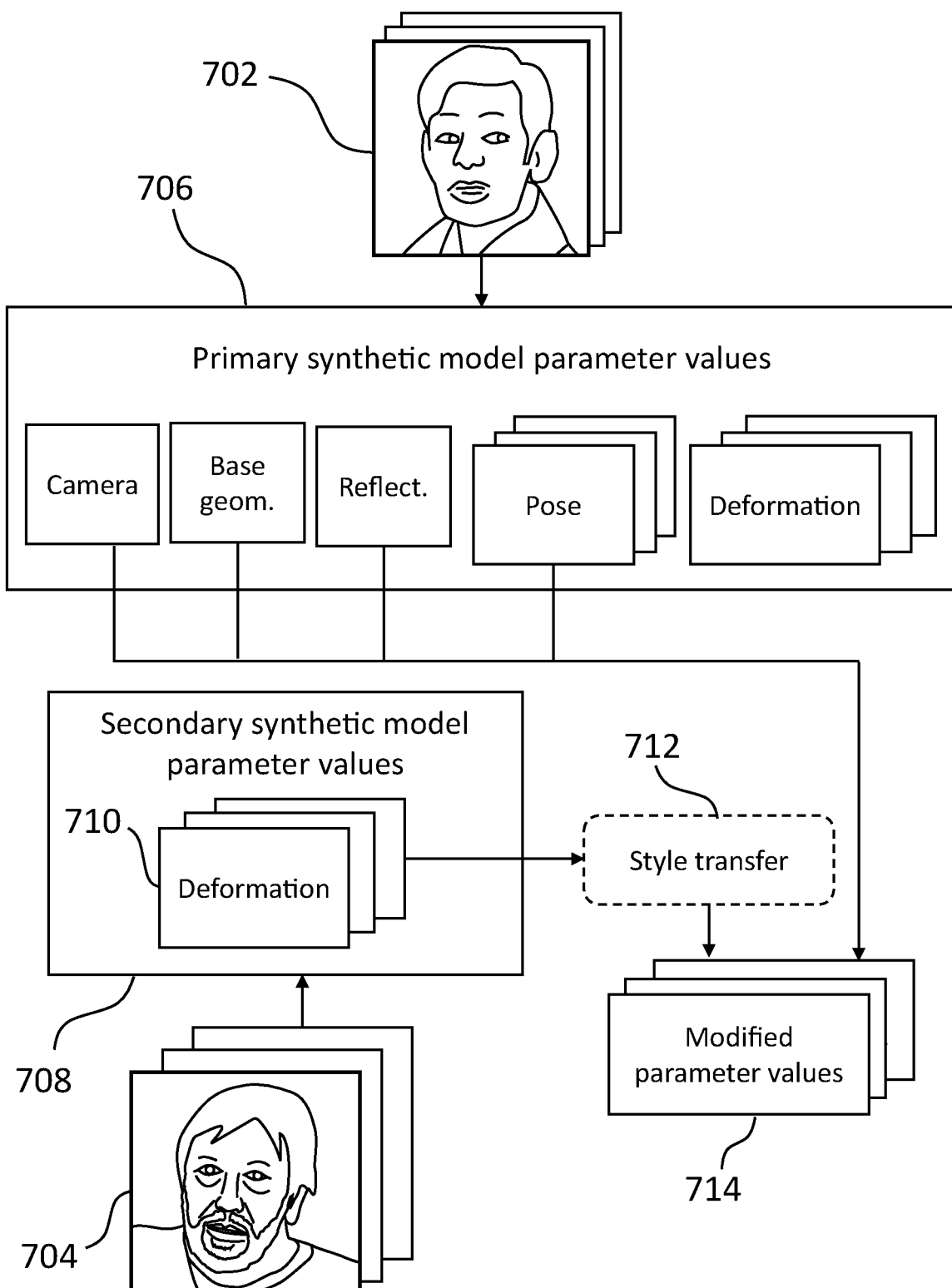
FIG. 7 shows schematically an example of modifying an instance of an object based on video driving data.

FIG. 7 shows an example in which parameter values for a synthetic model of a specific human face are modified in dependence on video driving data 704. As a result, an instance 702 of the face may be modified. The instance 702 may for example correspond to an actor speaking a line from a film in a primary language, and the video driving data 704 may correspond to a dubbing actor speaking a translation of the same line in a secondary language. In this example, the video driving data 704 and/or the instance 702 have been clipped such that the video driving data 704 and the instance 702 span the same number of frames. In this example, primary synthetic model parameters 706 are derived for the instance 702 using the methods described above. The primary synthetic model parameters include fixed parameters encoding intrinsic camera parameters, a base geometry and a reflectance model, along with variable parameters for each frame of the instance 702 encoding a respective pose and deformation to the base geometry. Secondary model parameters 708 are then derived for the video data driving data 704 using the same methods described above. The secondary parameter values 708 include secondary deformation parameter values 710 for each frame of the video driving data 704, indicating a deformation of a base geometry determined for the dubbing actor (in the context of a human face, the deformations may represent facial expressions). Style transfer 712 is optionally performed in which the secondary deformation parameter values 710 are adjusted for stylistic consistency with deformation parameter values derived for the primary object (the primary language actor, in this case). The style transfer 712 may be performed manually for example by a VFX artist, or alternatively may be performed automatically or semi-automatically. The style transfer 712 may be performed using a style transfer neural network trained to modify deformation parameter values derived from a secondary source (for example, a video source) for stylistic consistency with deformation parameters derived from a primary source. The training may be performed using two style transfer neural networks respectively configured to transfer primary deformation parameter values to secondary deformation parameter values and back again. The generator networks may be adversarially trained with cyclic consistency.

The style transfer 712 enables a deformation derived from a given secondary source to be "translated" into a stylistically consistent deformation for the primary object. Style transfer 712 may be unnecessary in some cases, for example where the secondary source is stylistically similar to the primary source, or where the primary source and the secondary source depict the same object. The latter would occur for example when an actor's performance is transposed from one take of a scene to another take of a scene.

The primary parameter values 706 for the synthetic model, excluding the primary deformation parameter values, may be combined with the (possibly style-transferred) secondary deformation parameter values 710, to generate modified parameter values 714 for the synthetic model.

It is noted that, whilst in the example of FIG. 7 modified parameter values for a synthetic model are determined using video driving data, in other examples modified parameter values for a synthetic model may be determined using audio driving data, or a combination of video driving data and audio driving data. In these cases, a further audio driven neural network or mixed-mode neural network may be trained to determine parameter values for the synthetic model.

Returning to FIG. 6, rendering 616 is performed in which the machine learning model, using the trained parameter values 210 for the machine learning mode, renders a modified first instance 618 of the object, in dependence on the modified first parameter values 614 for the synthetic model of the object. The rendering 616 may for example include processing the modified first parameter values 614 using a conditional GAN. Alternatively, the rendering may include generating synthetic images from the synthetic model of the object, and using the synthetic images to generate the modified first instance 618 of the object.

Figure 8:
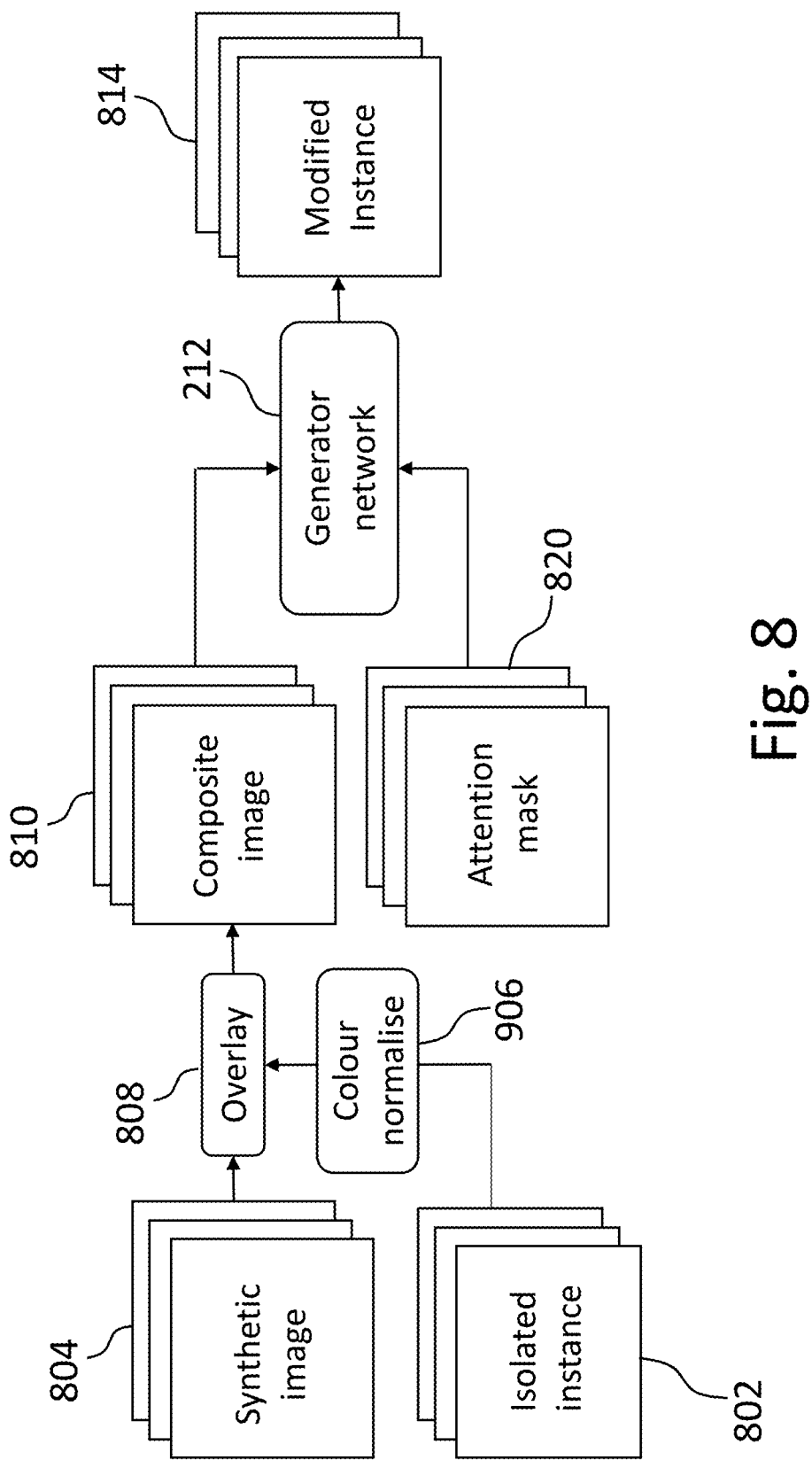
FIG. 8 shows schematically a method of modifying an instance of an object in a sequence of image frames, using the deep neural network of FIG. 4.

FIG. 8 shows an example of a method of rendering a modified instance of an object, using the trained generator network 212 of FIG. 2. The method is equivalent to the method of FIG. 2, but without the discriminator network 416 and associated functionality for training the generator network 212. The synthetic images 804 of FIG. 8 are rendered from the synthetic model using modified parameter values. The composite images 810 are therefore hybrid images in which the part of the synthetic images to be overlaid corresponds to different parameter values to the rest of the isolated instance. The trained generator network 212 nevertheless converts these hybrid images into a photorealistic modified instance of the object.

It is noted that the isolated instance 802, and accordingly the composite image 810, may be at a higher resolution than the images used to train the generator network 212. In some examples, the generator network 212 may be a fully convolutional network (i.e. containing no fully connected layers). In this case, the generator network 212 may be capable of processing the high resolution input images to generate high resolution output images, in spite of having been trained on lower resolution images. Alternatively, the isolated instance 802 (or the composite image 810) may be downsized or compressed before being input to the generator network 212. In this case, a super-resolution neural network may be applied to the output of the generator network 212 to generate photorealistic outputs at an appropriate resolution. The inventors have found this latter approach to produce highly plausible rendering outputs.

In some examples, such as the example of FIG. 7 above, parameter values derived from an isolated instance of an object are replaced with parameter values derived from a driving data source. The instance of the object may therefore be modified for all image frames containing the instance of the object. In other examples, it may be sufficient, and indeed preferable, to modify the instance of the object only for a subset of frames containing the instance of the object. In the case of visual dubbing, modifying the mouth shape of a primary language actor for all image frames containing the primary language actor, or for all image frames containing the primary language actor in which the primary language actor speaks, may lead to unrealistic results which adversely affect viewing experience. The inventors have discovered that the viewing experience may be less adversely affected by modifying the mouth shape of the primary language actor only at certain times, for example where either the primary language actor or the secondary language actor has a closed mouth, which is easily detectable as incompatible with most vocal sounds.

Figure 9:
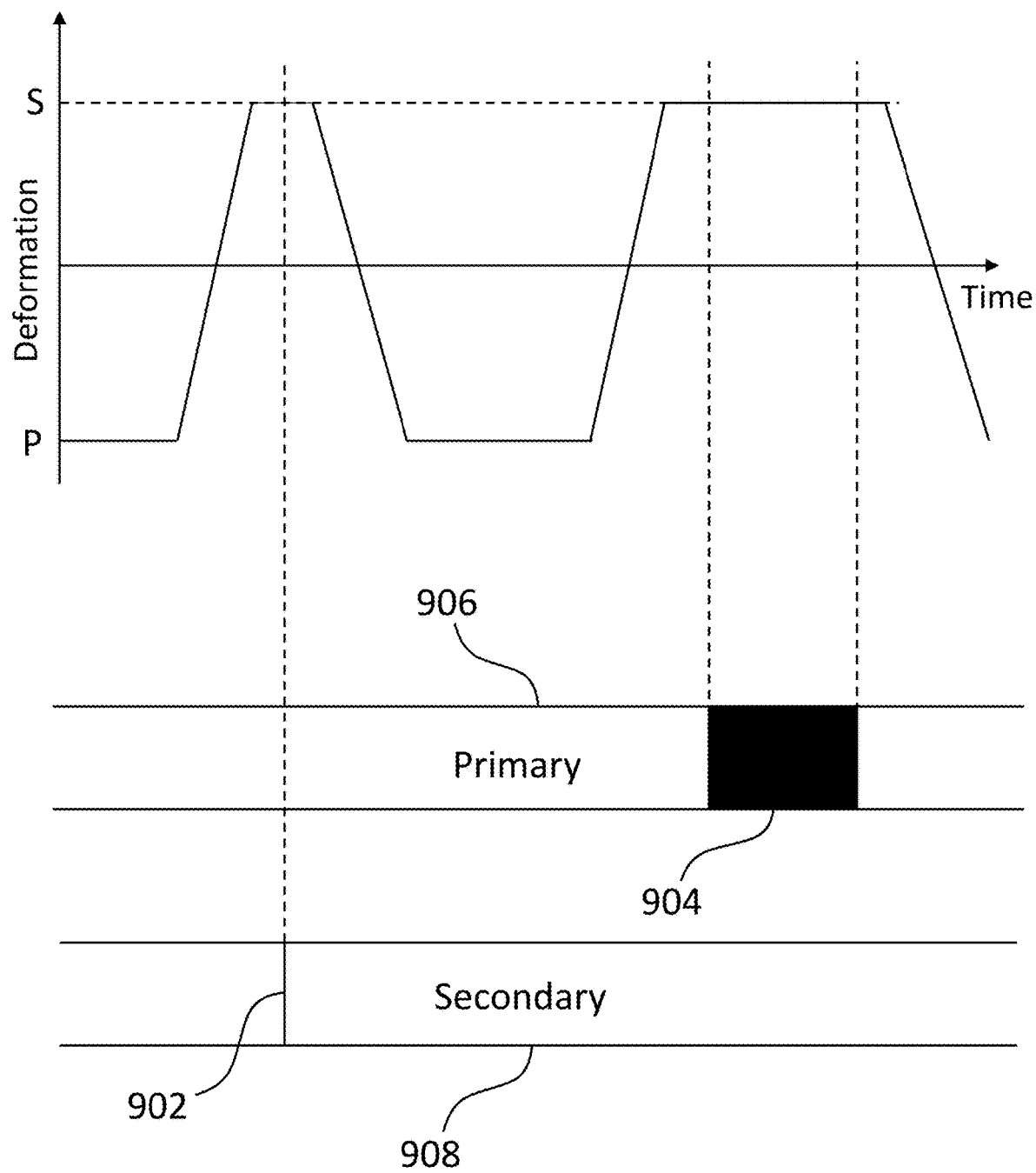
FIG. 9 shows an example of modifying an instance of an object by a varying degree, in accordance with examples.

FIG. 9 shows an example in which two sets of parameter values are derived for a synthetic model of an object. In particular, a primary set of parameter values is derived from a primary video source containing an instance of the object, and a secondary set of parameter values is derived from a secondary driving data source (which may for example be a video source or an audio source). In this example, the primary set of parameter values and the secondary set of parameter values differ only by their deformation parameter values. By interpolating the deformation parameter values of the synthetic model between the primary values and the secondary values, the synthetic model may be controlled to vary between the corresponding deformations. In this way, the extent to which the object is modified may be controlled, for example maximized only when certain events occur, or otherwise moderated to limit the extent to which the object is modified. For example, a synthetic model of a primary language actor's face may be varied between a performance of the primary language actor and a performance of a secondary language actor. The resulting blended performance may be preferable to maximally modifying the performance of the primary language actor throughout the period in which the actor is speaking. In the example of FIG. 9, the deformation parameter values are interpolated between the primary language actor's performance P and the secondary language actor's performance S. In particular, the secondary language actor's performance is phased in and out around an event 902 in which the secondary actor's mouth is closed, and around an event 904 in which the primary actor's mouth is closed. The secondary language actor's mouth closes briefly at the event 902 when the secondary actor utters a plosive sound (such as a letter "p"), and the primary language actor's mouth closes for a longer period when the primary actor utters a bilabial nasal sound (such as a letter "m").

The events 902 and 904 may be manually determined, for example by an editor reviewing footage of the primary actor and the secondary actor and marking the time(s) at which certain events, such as closed mouth events, occur. Alternatively, such events may be detected automatically from audio data or video data. For example, a suitable audio filter or machine learning model (e.g. a recursive neural network or a temporal convolutional neural network) may be used to identify certain auditory events, such as plosives or bilabial nasal sounds, within audio data. Alternatively, a suitable machine learning model may be trained to visually identify such events. In the example of FIG. 9, the events 904 and 902 are detected automatically in a primary audio track 906 and a secondary audio track 908 respectively, and interpolation of deformation parameter values is automated such that the secondary performance is incrementally or progressively phased in a predetermined time before the events 902, 904, and incrementally or progressively phased out a predetermined time after the events 902, 904.

Having rendered a modified first instance 618 of the object, the method of FIG. 6 proceeds with object replacement 620, in which at least part of the first instance 606 of the object is replaced with a corresponding at least part of the modified first instance 618 of the object. This replacement may be achieved by compositing the modified first instance 618 with the first sequence of image frames 602, where the compositing process involves overlaying the modified first instance 618 of the object (or part thereof) onto the first sequence of image frames 602 using the metadata stored in association with the first instance 606 of the object. Any stabilizing, registration, or color normalization applied during isolation of the first instance 606 is applied in reverse to the modified first instance 618 (i.e. inverted) before the overlaying takes place. A soft mask (alpha matte) may be applied to part of the modified first instance of the object which is to be overlaid (for example, a lower region of a face including the mouth and excluding the eyes) to achieve a gradual blend between the replaced part and the underlying image frames. The mask may be generated using the synthetic model of the object. In particular, a suitable region may be defined on the ST map described above, applied to the synthetic model using UV mapping, and a projection rendered for each image frame of the modified instance of the object. The rendered projection may then be used to define the geometry of the mask for the compositing process. This approach results in a mask which adheres to the geometry of the object, and only needs to be defined once for a given object or for a given instance of an object. The region on the ST map may be defined manually or automatically, for example by reference to predetermined feature vertices on the synthetic model (as used for synthetic model fitting as described above). The ST map may be the same map used to generate a composite image as described with reference to FIG. 7.

In some examples, noise may be applied to the replaced part of the object to match digital noise or grain appearing in the first sequence of image frames (which may otherwise not appear in the rendered part of the object). For example, Perlin noise may be applied with a scale and intensity to match any digital noise appearing within the image frames.

The compositing process generates a modified sequence of image frames in which an instance of an object has been replaced. In some cases, the modified sequence of image frames can simply replace the original image frames in the video data. This may be possible where an instance of an object is to be replaced or modified for every image frame in which the instance of the object is visible. In other cases, transitioning directly from the original image frames to the modified image frames can result in undesirable effects and artefacts. In the example of visual dubbing, transitioning from footage of an actor speaking in a primary language to a synthetic render of the actor speaking in a secondary language may result in the actor's mouth instantaneously changing shape, for example from an open position to a closed position, or vice versa. In order to mitigate these issues, the inventors have developed techniques which can result in a more seamless transition from an original instance of an object to a modified instance of an object, or vice versa.

Figure 10:
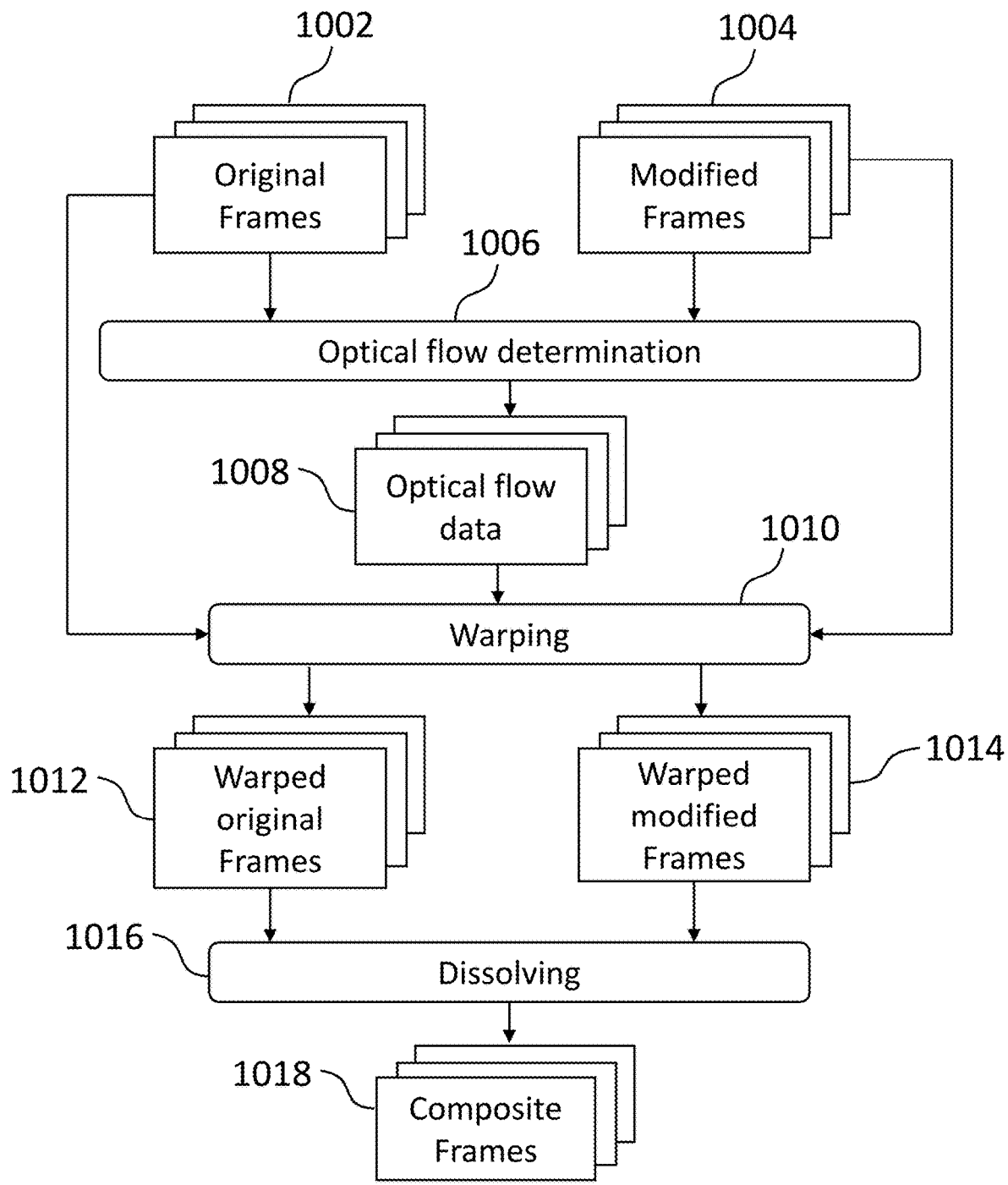
FIG. 10 shows schematically a method of transitioning from an instance of an object to a modified instance of the object within a sequence of image frames, in accordance with examples.

FIG. 10 shows an example of a method of processing video data comprising a sequence of original image frames 1002 and a sequence of modified image frames 1004. The modified image frames 1004 are identical to the original image frames 1002, except that in the modified image frames 1004 an instance of an object appearing within the image frames has been modified and replaced using the techniques described herein. To generate the modified image frames 1004, at least part of the modified instance of the object has been composited with the original image frames 1004, thereby to replace the original instance of the object. In this example, the sequence of original image frames 1002 precedes a further sequence of original image frames (not shown), which are to be replaced with corresponding modified image frames. The further sequence of image frames may for example include footage of an actor speaking in a primary language, to be dubbed into a secondary language. The sequence of original image frames 1002 may include image frames in which the actor first starts speaking in the primary language, or shortly before the actor first starts speaking in the primary language.

The method proceeds with optical flow determination 1006. For each original image frame 1002 and corresponding modified image frame 1004, optical flow data 1008 is generated which determines how to displace pixels of the original image frame 1002 such that the displaced pixels approximately match pixels of the modified image frame 1004. The optical flow data 1008 may indicate or encode a displacement or velocity for each pixel of the original image frame 1002, or for a subregion of the original image frame 1002 in which the object to be replaced appears. Optical flow is conventionally used to estimate how an object moves within a sequence of image frames containing footage of the object. In the present case, optical flow is instead used to determine a mapping of pixel positions from original footage of an object to pixel positions of a synthetic render of the object. This is made possible by the photorealistic renders generated by the machine learning models described herein. The optical flow determination 1008 may be performed using any suitable method, for example phase correlation, block-based methods, differential methods, general variational methods, or discrete optimization methods.

The method of FIG. 10 continues with warping 1010, in which the optical flow data 1008 is used to displace pixels of the original frames 1002 in directions as indicated by the optical flow data 1008 to generate warped original image frames 1012, and to displace pixels of the modified image frame 1004 in directions opposite to those indicated by the optical flow data 1008 to generated warped modified image frames 1014. This process results in warping of the object as appearing in the original image frames 1002 towards the object as appearing in the modified image frames 1004 and vice versa. In order to incrementally warp the original image frames 1002 into the modified image frames 1004, the distances by which the pixels of the original image frames 1002 and the modified image frames 1004 are displaced varies from one image frame to the next. At the start of the sequences, the original image frame 1002 is unaltered and the modified image frame 1004 is maximally warped (corresponding to pixels being moved by 100% of the distance indicated by the optical flow data 1008). At the next time step in the sequence, pixels of the original image frame 1002 are displaced by a fraction F1 of the distance indicated by the optical flow data 1008 (for example F1=5%, 10%, 20%, or any other suitable fraction depending on the number of image frames over which the transition is to take place), and pixels of the modified image frame 1004 are displaced by a fraction 100%—F1 of the maximum distance. At the next step of the sequences, pixels of the original image frame 1002 are displaced by a fraction F2 of the distance indicated by the optical flow data 1008 and pixels of the modified image frame 1004 are displaced by a fraction 100%—F2 of the maximum distance, where F2>F1. This process continues incrementally, with the fractions F1, F2, F3 . . . increasing at each time step, until the last time step in the sequence in which original image frame 1002 is maximally warped and the modified image frame 1004 is unaltered. In this way, at each time step, pixels of the warped original image frames 1012 and the warped modified image frames 1014 approximately match one another. The fractions F1, F2, F3, . . . may increase linearly with frame number, or in accordance with another increasing function of the frame number.

The method proceeds with dissolving 1016, in which the warped original image frames 1012 are incrementally dissolved into the warped modified image frames 1014 to generate composite image frames 1018. The composite image frames 1018 thereby transition from an original image frame 1002 at the start of the sequence to a modified image frame 1004 at the end of the sequence. For at least some time steps in the sequence, the dissolving 1016 may determine pixel values for the composite image frames 1018 based on a weighted average of pixel values of the warped original frames 1012 and pixel values of the warped modified image frames 1014, where the weighting for the warped original image frames 1012 decreases each time step and the weighting for the warped modified image frames 1014 increases each time step. The weighting for the warped original image frames 1012 may decrease from 1 to 0 according to a linear or nonlinear function of the frame number, whereas the weighting for the warped modified image frames 1014 may increase from 0 to 1 according to a linear or nonlinear function of the frame number. The incremental dissolving is therefore achieved as an incremental interpolation between pixel values of the warped original image frames 1012 to the pixel values of the warped modified image frames 1014.

The inventors have found that a more life-like transition which maintains image sharpness when warping from original image frames 1002 to the modified image frames 1004 (or vice versa) can be achieved by concentrating the incremental dissolving 1016 within a central set of image frames over which the incremental warping 1010 is performed. For example, a rate of the incremental dissolving 1016 may increase then decrease in relation to a rate of incremental warping 1010. The incremental dissolving 1016 may be performed relatively rapidly compared with the incremental warping 1010, around halfway through the incremental warping 1010. The dissolving 1016 may be initiated at a later frame number than the warping 1010 and ended at an earlier frame number than the warping 1010, and/or the dissolving 1016 may be performed using a more rapidly varying function than the warping 1010. In this way, the incremental dissolving is concentrated within a central few image frames over which the incremental warping 1010 is performed. In an example, the incremental warping 1010 may be performed linearly, whilst the incremental dissolving 1016 may be performed by a factor corresponding to a smooth step function or sigmoid-like function which smoothly transitions from a substantially flat horizontal section at 0 to a substantially flat horizontal section at 1.

To illustrate the method, FIG. 11 shows an example of a sequence of original image frames O1-O5, and a sequence of modified image frames M1-M5. Optical flow data OF1-OF5 is determined for each time step, where the optical flow data for a given time step indicates an estimated warping relating the original image frame to the modified image frame. For example, the optical flow data OF1 indicates an estimated warping for transforming the original image frame O1 to the modified image frame M1, and so on. The graph shows an example of how the incremental warping and the incremental dissolving may be applied. For the incremental warping, the factor on the vertical axis represents the distance that pixels are displaced by as a fraction of the maximum distance indicated by the optical flow data. A factor of 0 means the pixels remain in their original positions, whereas a factor of 1 means that pixels are displaced by the maximum distance. For the incremental dissolving, the factor on the vertical axis represents to what extent the (warped) original image frame is replaced by the (warped) modified image frame. A factor of 0 corresponds to the (warped) original image frame, whereas a factor of 1 corresponds to the (warped) modified image frame.

In this example, the warping is applied in linearly increasing increments and the first warped frame is frame number 1. The dissolving is applied with a smooth step function. Before the most rapidly varying section of the smooth step function, the rate at which the incremental dissolving takes place increases in relation to the rate at which the incremental warping takes place. After the most rapidly varying section of the smooth step function, the rate at which the incremental dissolving takes place decreases in relation to the rate at which the incremental warping takes place. The incremental dissolving is concentrated within central frames of the incremental warping. Although in this example the rate of dissolving relative to the rate of warping increases and decreases smoothly, in other examples the rate of dissolving relative to the rate of warping may increase then decrease non-smoothly, for example in an instantaneous fashion.

Although the machine learning models described herein may be capable of learning to recreate lighting and color characteristics which appear consistently in their training data, in some cases the rendered instances of an object may not capture other lighting or color characteristics which vary locally or from one instance to another. This may happen for example where a shadow moves across an object in a scene of a film. Such issues may be addressed using color grading, in which visual attributes of an image such as contrast, color, and saturation are varied. Color grading may be performed manually, but this is a time consuming process requiring input from a skilled VFX artist.

Figure 12:
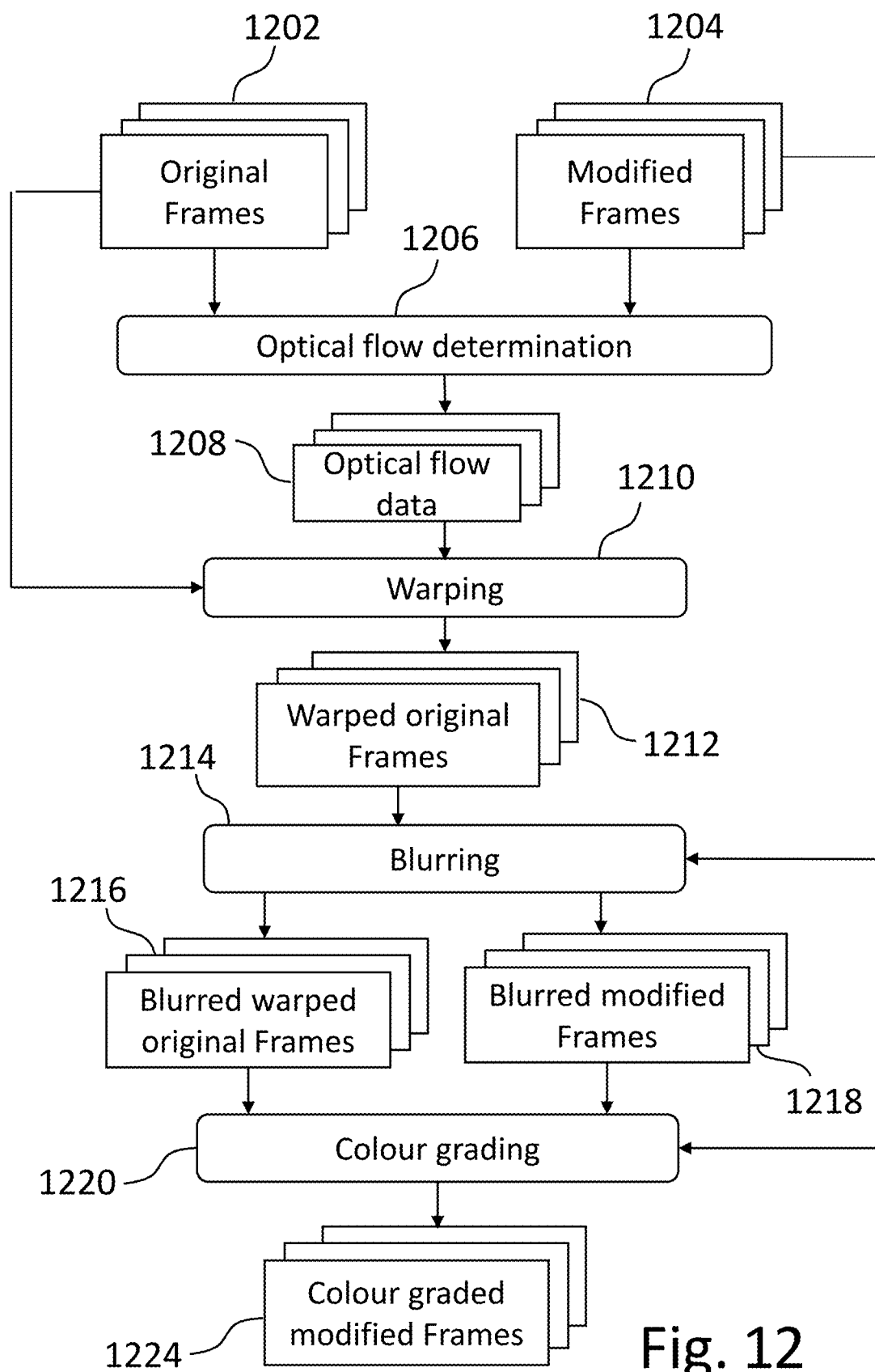
FIG. 12 shows schematically a method of performing automatic color grading when transitioning from an instance of an object to a modified instance of the object within a sequence of image frames, in accordance with examples.

FIG. 12 shows an example of a method of performing automated color grading, which may be used instead of, or in addition to, manual color grading as mentioned above. The method involves processing video data comprising a sequence of original image frames 1202 and a sequence of modified image frames 1204, where in the modified image frames an instance of an object has been modified using the techniques described herein. It is desirable for the color and lighting characteristics of the modified image frames 1204 to closely resemble those of the corresponding original image frames 1202, which may not be guaranteed for the region containing the modified instance of the object. In order to achieve this, the method proceeds with optical flow determination 1206 to estimate a warping relating the original instance of the object to the modified instance of the object. The estimated warping is indicated by optical flow data 1208, which may indicate or encode a displacement or velocity for each pixel of an original image frame 1202, or for a subregion of the original image frame 1202 in which the object to be replaced appears. The method continues with warping 1210, in which the optical flow data 1008 is used to displace pixels of the original frames 1202 in directions as indicated by the optical flow data 1208, to generate warped original image frames 1212. Unlike the method of FIG. 10, in which warping is performed incrementally, the warping 1210 of FIG. 12 may be performed to the extent indicated by the optical flow data 1208 for original image frame 1202. As a result, pixels of the warped original image frames 1212 and the modified image frames 1204 approximately match. In a further example, the modified image frames 1204 may be warped to coincide with the original image frames 1202. In a still further example, partial warping may be performed on the original image frames 1202 and the modified image frames 1204 (in either of these further examples, pixels of the modified image frames 1204 would need to be warped back to their original positions after the color grading process).

The method continues with blurring 1214, in which a blurring filter is applied to the warped original image frames 1212 to generate blurred warped original image frames 1216, and to the modified image frames 1204 to generated blurred modified image frames 1218. The blurring filter may be a two-dimensional Gaussian filter, a box blurring filter, or any other suitable form of low pass filter. The blurring filter may have a finite size or characteristic size in the range of a few pixels, such as between 3 and 20 pixels or between 5 and 10 pixels. In the context of a two-dimensional Gaussian filter, the characteristic size may refer to the standard deviation of the Gaussian filtering distribution. The effect of the blurring 1214 is to remove high resolution detail such that pixels of the resulting image frames represent the ambient color in the region of those pixels. By selecting an appropriate size for the blurring filter, local variations in ambient color and lighting may be captured on a relatively short scale.

The method proceeds with color grading 1220, in which the blurred warped original image frames 1216 and the blurred modified image frames 1218 are used to modify the color characteristics of the modified image frames 1204, to generated color graded modified image frames 1220. Since the warped original image frames 1212 approximate the modified image frames 1204, pixels of the blurred warped original image frames 1216 also represent the desired ambient color for the corresponding pixels of the modified image frames 1204. The ratio of pixel values of the blurred warped original image frames 1216 to pixel values of the blurred modified image frames 1218 therefore represents a spatially varying color correction map to be applied to the modified image frames 1204. Accordingly, the color grading 1220 may be performed by pixelwise dividing the blurred warped original image frames 1216 by the blurred modified image frames 1218, and pixelwise multiplying the result by the modified image frames 1204 (or performing equivalent mathematical operations). The resulting color graded modified image frames 1222 inherit the local color characteristics of the original image frames 1202, whilst retaining the fine scale detail of the modified image frames 1222.

Figure 13:
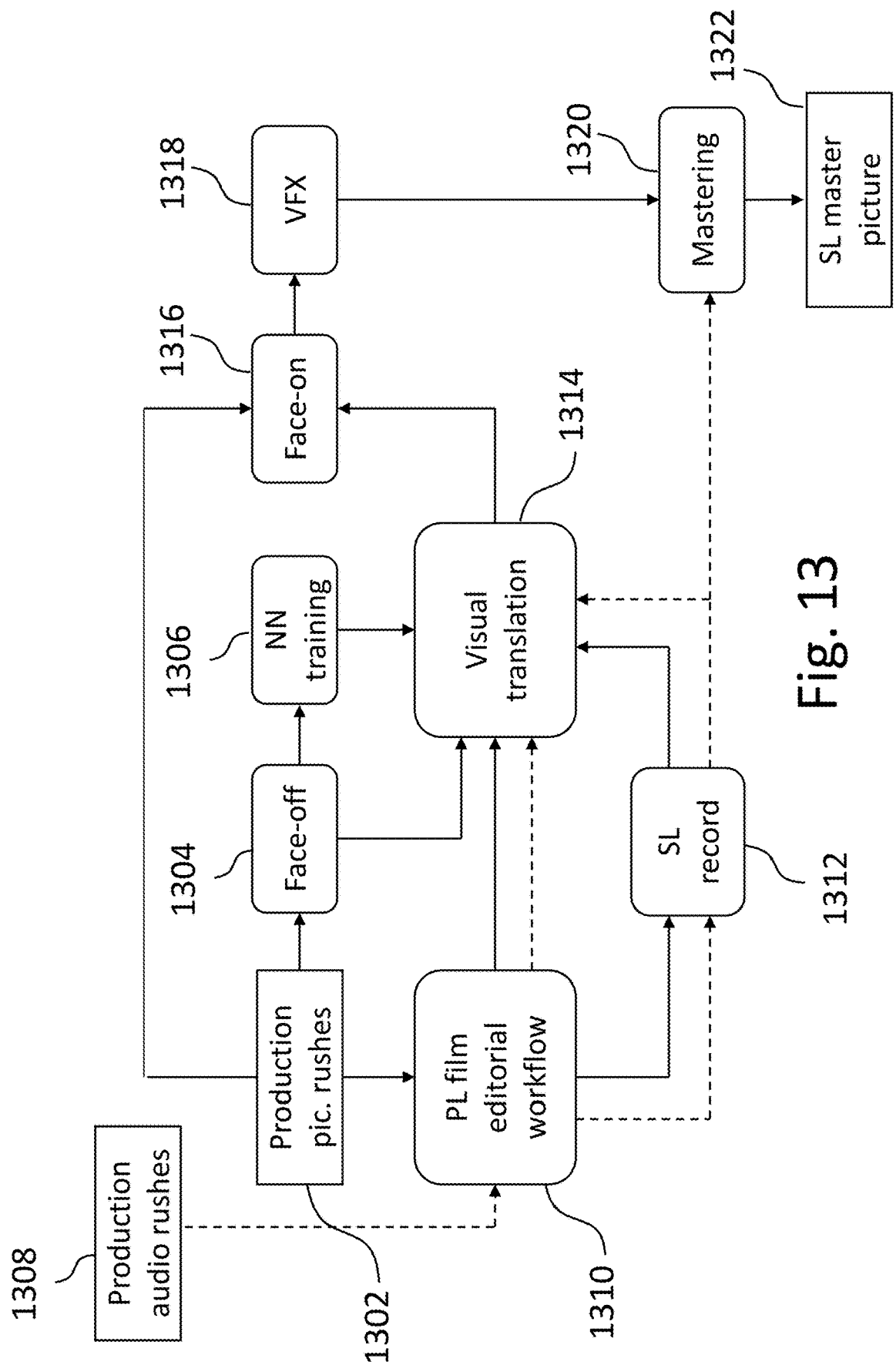
FIG. 13 shows schematically a filmmaking pipeline for a foreign language version of a film including visual dubbing, in accordance with examples.

FIG. 13 shows a filmmaking pipeline for a foreign language version of a film in which visual dubbing is performed in accordance with the certain methods described herein. The solid arrows in FIG. 13 represent paths of video data whereas the dashed arrows represent paths of audio data. In this example, production picture rushes 1302 undergo a face-off process 1304 in which instances of actors' faces are detected and isolated (possibly at reduced resolution). The resulting isolated instances of the actors' faces are then used for neural network training 1306. In this example, a separate neural network is trained for each speaking actor in each scene (owing to the fact that different scenes are likely to have different visual characteristics).

Whilst the neural network training 1306 takes place, the production picture rushes 1302 and associated production audio rushes 1308 are used in the primary language (PL) editorial workflow 1310, which includes an offline edit in which footage from the production picture rushes is selected for the final film. The resulting offline edit (picture and audio) are used to guide secondary language (SL) recording 1312, which may involve multiple secondary language actors recording secondary language audio for multiple primary language actors and/or in multiple secondary languages. In this example, the SL recording 1312 includes video recording and audio recording. In other examples, SL recording may only involve audio recording. The offline edit may further be used to determine which instances of the primary language actors' faces need to be translated.

The video and/or audio data resulting from the SL recording 1312 is used as driving data for visual translation 1314, in which the neural networks trained at 1306 are used to generate photorealistic translated instances of the primary language actors' faces where necessary for incorporation into the film. The resulting translated instances undergo a face-on process 1316 in which the translated instances are combined with the full-resolution master picture. VFX 1318 are then applied if necessary, followed by mastering 1320 of the full-resolution master picture and the secondary language audio, in order to create the final secondary language master picture 1322 for delivery.

The above embodiments are to be understood as illustrative examples of the invention. Further embodiments of the invention are envisaged. For example, in the context of visual dubbing, a machine learning model may be trained on footage of an actor from various sources, such as various films, and later used for visual dubbing of the actor in a new film. If sufficiently expressive synthetic models are used (for example, including a more sophisticated lighting model), then the methods described herein may be capable of generating photorealistic renders of the actor in scenes or films having differing visual characteristics. Furthermore, the methods described herein may be used for deep editing of objects other than human faces appearing within film. For example, the methods may be used to manipulate whole humans, animals, vehicles, and so on. Furthermore, deep inpainting may be used to composite modified objects back into a video, for example in cases where an outline of the object moves as a result of the modification.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computer-implemented method of processing input video data comprising a sequence of image frames, the method comprising:
    isolating an instance of an object within the sequence of image frames;
    generating, using a machine learning model, a modified instance of the object;
    determining optical flow data indicating an estimated warping relating the isolated instance of the object to the modified instance of the object over the sequence of image frames;
    applying the estimated warping to the isolated instance of the object to generate a warped instance of the object;
    adjusting colors of the modified instance of the object, based at least in part on the warped instance of the object, to generate a color-graded modified instance of the object; and
    generating output video data in which at least part of the isolated instance of the object is replaced with a corresponding at least part of the color-graded modified instance of the object for at least some image frames of the sequence of image frames.

2. The computer-implemented method of claim 1, wherein generating the output video data comprises:
    determining parameter values for a synthetic model of the object, the first parameter values corresponding to the isolated instance of the object;
    modifying the first parameter values for the synthetic model of the object to determine second parameter values for the synthetic model of the object, the second parameter values corresponding to the modified instance of the object;
    incrementally interpolating between the first parameter values and the second parameter values over a subsequence of the sequence of image frames, thereby to determine interpolated parameter values for the synthetic model of the object;
    generating, using the machine learning model, an incrementally modified instance of the object, based on the interpolated parameter values; and
    replacing the isolated instance of the object with the incrementally modified instance of the object within the subsequence of the sequence of image frames.

3. The computer-implemented method of claim 1, wherein generating the output video data comprises:
    determining optical flow data indicating, for a subsequence of the sequence of image frames, an estimated warping relating the instance of the object to the modified instance of the object;
    incrementally, over the subsequence of the sequence of image frames, applying the estimated warping to the instance of the object to determine an incrementally warped instance of the object;
    incrementally, over the subsequence of the sequence of image frames, applying an inverse of the estimated warping to the modified instance of the object to determine an incrementally warped modified instance of the object; and
    incrementally, over the subsequence of the sequence of image frames, dissolving the incrementally warped first instance of the object into the incrementally warped modified first instance of the object.

4. The computer-implemented method of claim 3, wherein:
    the incrementally dissolving takes place at a dissolving rate;
    the incrementally applying the estimated warping and the inverse of the estimated warping takes place at a warping rate; and
    a ratio of the dissolving rate to the warping rate increases to a maximum value then decreases within the subsequence of the sequence of image frames.

5. The computer-implemented method of claim 1, further comprising:
    blurring the warped instance of the object; and
    blurring the modified instance of the object,
    wherein adjusting the colors of the modified instance of the object is based on a pixelwise ratio of the blurred warped instance of the object and the blurred modified instance of the object, to generate the color-graded modified instance of the object.

6. The method of claim 5, wherein each of the blurring of the warped instance of the object and the blurring of the modified instance of the object is performed using a blurring filter with a characteristic length scale of between 3 and 20 pixels.

7. The computer-implemented method of claim 1, wherein the object is a human face.

8. The computer-implemented method of claim 7, wherein the at least part of the isolated instance of the object includes a mouth but excludes eyes of the human face.

9. The computer-implemented method of claim 1, further comprising:
    detecting an event in the sequence of image frames and/or in an audio track associated with the sequence of image frames;

determining one or more image frames of the sequence of image frames at which the detected event takes place; and determining a subsequence of the sequence of image frames in dependence on the determined one or more image frames at which the detected event takes place, wherein generating the output video data comprises modifying the input video data to progressively transition, over the determined subsequence of the sequence of image frames, between the at least part of the isolated instance of the object and the corresponding at least part of the color-graded modified instance of the object.

10. The computer-implemented method of claim 9, wherein determining the subsequence of the sequence of image frames is such that the subsequence of image frames ends before the event takes place.

11. The computer-implemented method of claim 9, wherein:
the subsequence of the sequence of image frames is a first subsequence of the sequence of image frames; and
said modifying of the video data is to progressively transition from the at least part of the isolated instance of the object to the corresponding at least part of the modified instance of the object,
the method comprising further modifying the video data to progressively transition from the at least part of the modified instance of the object back to the corresponding at least part of the isolated instance of the object, over a second subsequence of the sequence of image frames.

12. The computer-implemented method of claim 9, wherein the object is a human face, and the event is the human face uttering a plosive consonant or a bilabial nasal consonant.

13. The computer-implemented method of claim 1, wherein generating the modified instance of the object comprises:
determining, using the isolated instance of the object, parameter values for a synthetic model of the object;
modifying the parameter values for the synthetic model of the object; and
rendering the modified instance of the object using the trained machine learning model and the modified parameter values for the synthetic model of the object.

14. The computer-implemented method of claim 13, wherein the sequence of image frames is a first sequence of image frames, the instance of the object is a first instance of the object, and the parameter values for the instance of the object are second parameter values for the second instance of the object, the method further comprising:
identifying respective second instances of the object within a plurality of second sequences of image frames;
for at least some of the identified second instances of the object:
isolating said second instance of the object within image frames containing said instance of the object;
determining, using the isolated second instance of the object, associated second parameter values for the synthetic model of the object; and
training, using the isolated second instance of the object and the associated second parameter values for the synthetic model of the object, the machine learning model to reconstruct the isolated second instance of the object based at least in part on the associated second parameter values for the synthetic model of the object.

15. A non-transitory storage medium comprising machine readable instructions which, when executed by one or more processors, cause the one or more processors to perform a method of processing video data comprising a sequence of image frames, the method comprising:
isolating an instance of an object within the sequence of image frames;
generating, using a machine learning model, a modified instance of the object;
determining optical flow data indicating an estimated warping relating the isolated instance of the object to the modified instance of the object over the sequence of image frames;
applying the estimated warping to the isolated instance of the object to generate a warped instance of the object;
adjusting colors of the modified instance of the object, based at least in part on the warped instance of the object, to generate a color-graded modified instance of the object;
generating output video data in which at least part of the isolated instance of the object is replaced with a corresponding at least part of the color-graded modified instance of the object for at least some image frames of the sequence of image frames.

16. A system comprising at least one processor and at least one memory, wherein the memory comprises instructions to process input video data, the processing comprising:
isolating an instance of an object within the sequence of image frames;
generating, using a machine learning model, a modified instance of the object;
determining optical flow data indicating an estimated warping relating the isolated instance of the object to the modified instance of the object over the sequence of image frames;
applying the estimated warping to the isolated instance of the object to generate a warped instance of the object;
adjusting colors of the modified instance of the object, based at least in part on the warped instance of the object, to generate a color-graded modified instance of the object; and
generating output video data in which at least part of the isolated instance of the object is replaced with a corresponding at least part of the color-graded modified instance of the object for at least some image frames of the sequence of image frames.

17. The system of claim 16, wherein generating the output video data comprises:
determining optical flow data indicating, for a subsequence of the sequence of image frames, an estimated warping relating the instance of the object to the modified instance of the object;
incrementally, over the subsequence of the sequence of image frames, applying the estimated warping to the instance of the object to determine an incrementally warped instance of the object;
incrementally, over the subsequence of the sequence of image frames, applying an inverse of the estimated warping to the modified instance of the object to determine an incrementally warped modified instance of the object; and
incrementally, over the subsequence of the sequence of image frames, dissolving the incrementally warped first instance of the object into the incrementally warped modified first instance of the object.

18. The system of claim 17, wherein:
- the incrementally dissolving takes place at a dissolving rate;
- the incrementally applying the estimated warping and the inverse of the estimated warping takes place at a warping rate; and
- a ratio of the dissolving rate to the warping rate increases to a maximum value then decreases within the subsequence of the sequence of image frames.

19. The system of claim 16, wherein:
- the object is a human face; and
- the at least part of the isolated instance of the object includes a mouth but excludes eyes of the human face.

* * * * *

UNITED STATES PATENT AND TRADEMARK OFFICE
CERTIFICATE OF CORRECTION

| | | |
|---|---|---|
| PATENT NO. | : 11,715,495 B2 | Page 1 of 1 |
| APPLICATION NO. | : 17/561356 | |
| DATED | : August 1, 2023 | |
| INVENTOR(S) | : Scott Mann et al. | |

It is certified that error appears in the above-identified patent and that said Letters Patent is hereby corrected as shown below:

On the Title Page

Please remove Pablo GARRIDO as inventor.

Signed and Sealed this
Twenty-third Day of April, 2024

Katherine Kelly Vidal
*Director of the United States Patent and Trademark Office*